(12) United States Patent
Aoyama et al.

(10) Patent No.: US 10,209,582 B2
(45) Date of Patent: Feb. 19, 2019

(54) LIQUID CRYSTAL DISPLAY DEVICE

(71) Applicant: Sharp Kabushiki Kaisha, Sakai, Osaka (JP)

(72) Inventors: Iori Aoyama, Sakai (JP); Yuichi Kita, Sakai (JP); Takahiro Sasaki, Sakai (JP); Yoshiki Nakatani, Sakai (JP); Kazutaka Hanaoka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 60 days.

(21) Appl. No.: 15/315,407

(22) PCT Filed: May 29, 2015

(86) PCT No.: PCT/JP2015/065627
§ 371 (c)(1),
(2) Date: Dec. 1, 2016

(87) PCT Pub. No.: WO2015/186635
PCT Pub. Date: Dec. 10, 2015

(65) Prior Publication Data
US 2017/0097548 A1    Apr. 6, 2017

(30) Foreign Application Priority Data
Jun. 4, 2014  (JP) .................................. 2014-115592

(51) Int. Cl.
G02F 1/1335   (2006.01)
G02F 1/1337   (2006.01)
G02F 1/1343   (2006.01)

(52) U.S. Cl.
CPC .. *G02F 1/134363* (2013.01); *G02F 1/133621* (2013.01); *G02F 1/133707* (2013.01);
(Continued)

(58) Field of Classification Search
CPC ........................................ G02F 2001/134381
See application file for complete search history.

(56) References Cited

U.S. PATENT DOCUMENTS

2005/0024548 A1    2/2005  Choi et al.
2008/0303990 A1*  12/2008  Yoshihara ............. G02F 1/1368
                                                                  349/106
(Continued)

FOREIGN PATENT DOCUMENTS

JP    2002-365657 A    12/2002
JP    2006-523850 A    10/2006
WO    2013/001979 A1    1/2013

*Primary Examiner* — Alexander Gross
(74) *Attorney, Agent, or Firm* — Keating & Bennett, LLP

(57) ABSTRACT

A liquid crystal display device (100) includes a liquid crystal display panel (1) including a first substrate (10), a second substrate (20), and a liquid crystal layer (30). The first substrate includes a first electrode (11) provided for each pixel, and a second electrode (12) for generating a lateral field across the liquid crystal layer in cooperation with the first electrode. The second substrate includes a third electrode (21) for generating a vertical field across the liquid crystal layer in cooperation with the first electrode and the second electrode. Each pixel is capable of switchably presenting a black displaying state where a vertical field is generated across the liquid crystal layer, a white displaying state where a lateral field is generated across the liquid crystal layer, and a transparent displaying state where a rear face side of the liquid crystal display panel is visible in a see-through manner with no voltage being applied to the liquid crystal layer. The first electrode includes a plurality of linear portions (11a), the plurality of linear portions being arranged so that at least one of the following exists in a plurality: the direction that the linear portions extend and the pitch of the linear portions.

12 Claims, 12 Drawing Sheets

(52) U.S. Cl.
CPC ............... *G02F 1/134309* (2013.01); *G02F 2001/133622* (2013.01); *G02F 2001/133757* (2013.01); *G02F 2001/134381* (2013.01)

(56) References Cited

U.S. PATENT DOCUMENTS

| | | | |
|---|---|---|---|
| 2009/0322995 A1* | 12/2009 | Yonemura | G02F 1/134363 349/96 |
| 2014/0002761 A1* | 1/2014 | Heo | G02F 1/1343 349/33 |
| 2014/0111561 A1 | 4/2014 | Iyama et al. | |

* cited by examiner

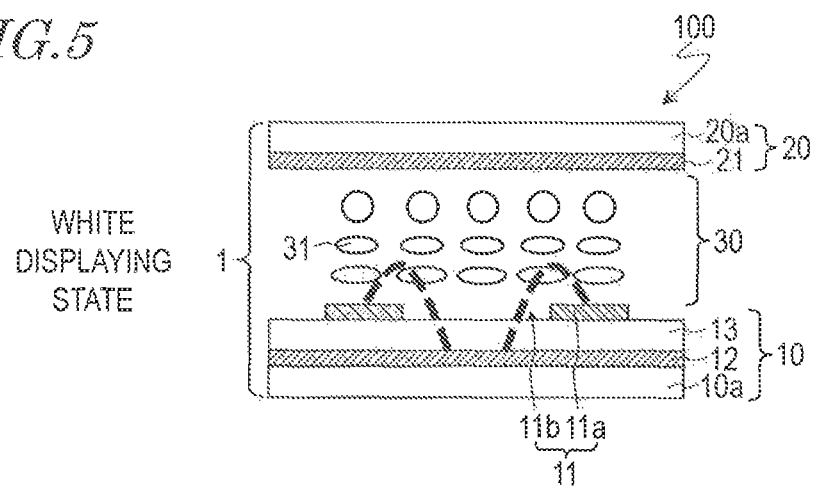
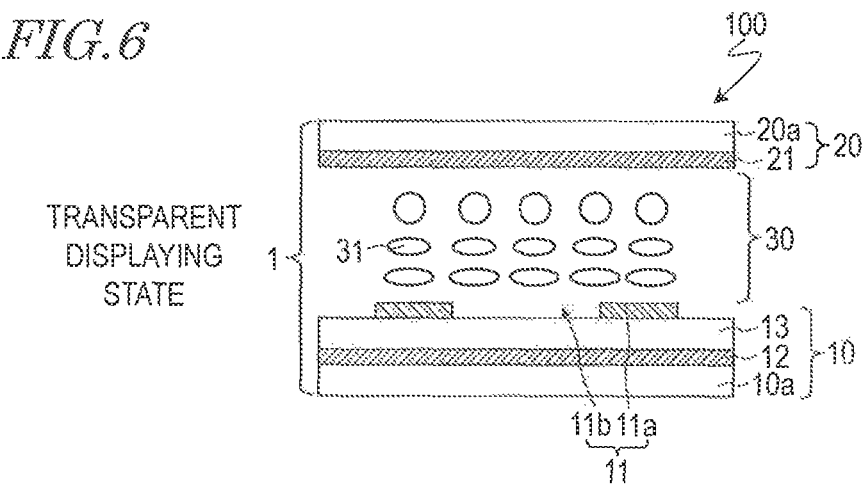

*FIG.11*
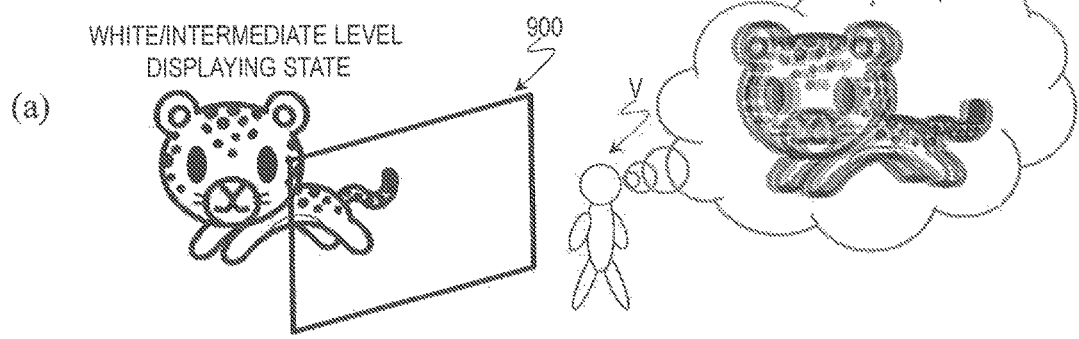
(a)
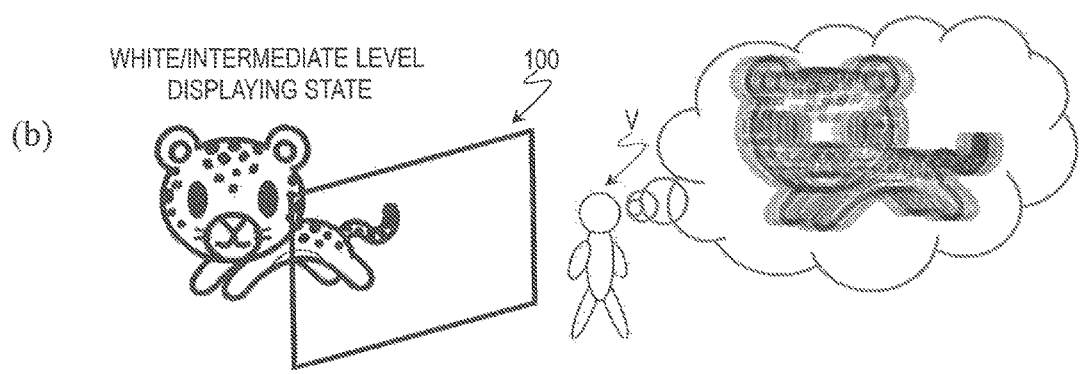
(b)
*FIG.12*
(a) 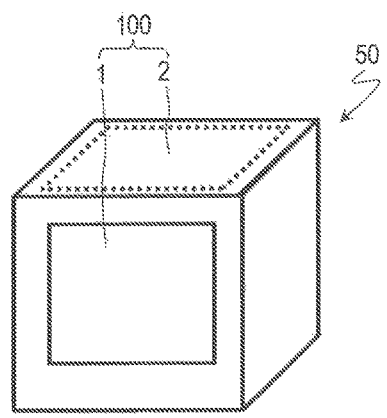  (b) 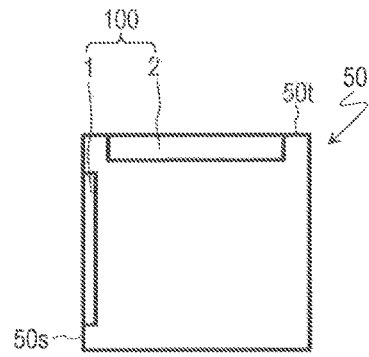

FIG. 19
(a) 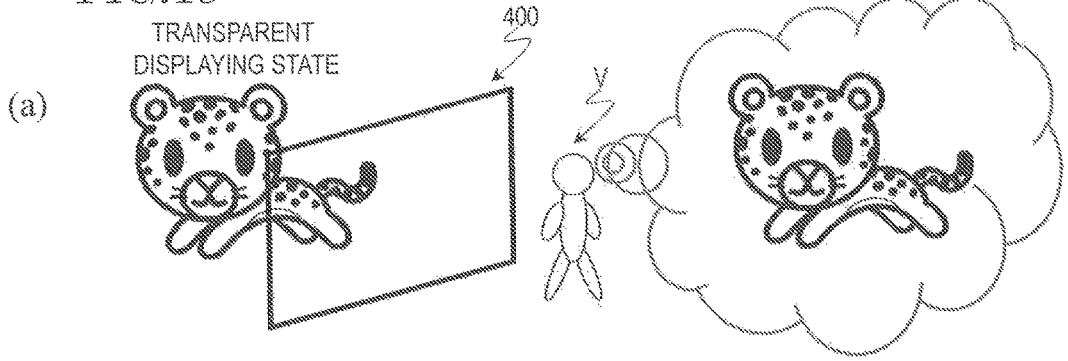
(b) 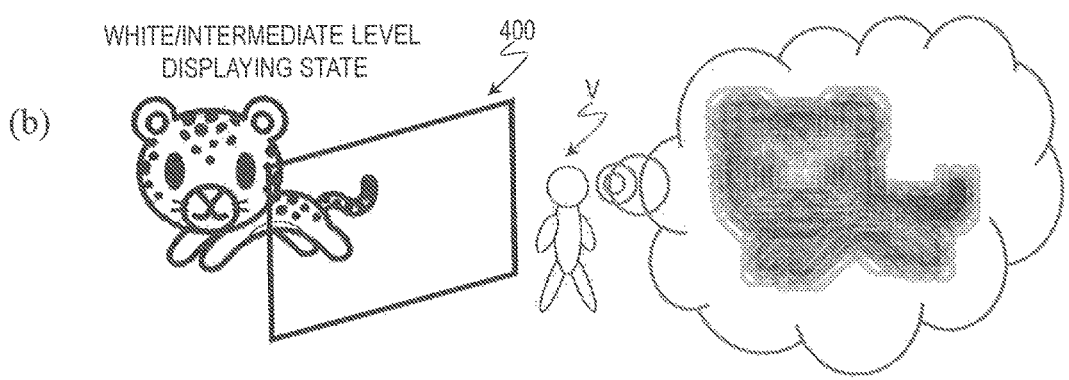
FIG. 20
Lorem ipsum dolor sit amet,
consectetuer adipiscing elit.
Aenean commodo ligula eget dolor.
FIG. 21
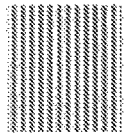
FIG. 22
Lorem ipsum dolor sit amet,
consectetuer adipiscing elit.
Aenean commodo ligula eget dolor.

FIG. 23

Lorem ipsum dolor sit amet,
consectetur adipiscing elit.
Aenean commodo ligula eget dolor.

FIG. 24

Lorem ipsum dolor sit amet,
consectetur adipiscing elit.
Aenean commodo ligula eget dolor.

FIG. 25

Lorem ipsum dolor sit amet,
consectetur adipiscing elit.
Aenean commodo ligula eget dolor.

FIG. 26

Lorem ipsum dolor sit amet,
consectetur adipiscing elit.
Aenean commodo ligula eget dolor.

LIQUID CRYSTAL DISPLAY DEVICE

TECHNICAL FIELD

The present invention relates to a liquid crystal display device, and more particularly to a liquid crystal display device which is suitable for use as a see-through display.

BACKGROUND ART

In recent years, see-through displays have been attracting attention as the display devices for information display systems or digital signage. In a see-through display, the background (i.e., the rear-face side of the display panel) is visible in a see-through manner, whereby a novel manner of display that was never possible with conventional display devices can be achieved. Thus, a see-through display has good appeal and eyecatchingness. Application of see-through displays to showcases and show windows has also been proposed.

In the case where a liquid crystal display device is used for a see-through display, its low efficiency of light utilization will be a detriment. The reasons for the low efficiency of light utilization of a liquid crystal display device are the color filters and polarizing plates, which are provided in generic liquid crystal display devices. The color filters and polarizing plates absorb light in specific wavelength regions or light of specific polarization directions.

This has led to the idea of using a liquid crystal display device of the field sequential method. Under the field sequential method, multicolor displaying is performed through time-division switching between colors of light with which a liquid crystal display panel is irradiated from an illumination element. This eliminates the need for color filters, thus improving the efficiency of light utilization. However, in the field sequential method, the liquid crystal display device needs to have a rapid response.

Patent Documents 1 and 2 disclose liquid crystal display devices having improved response characteristics because of an electrode structure being provided which is capable of switchably generating a vertical field and a lateral field across the liquid crystal layer. In the liquid crystal display devices disclosed in Patent Documents 1 and 2, a vertical field is generated across the liquid crystal layer in either one of the transition (rise) from a black displaying state to a white displaying state and the transition (fall) from a white displaying state to a black displaying state, while a lateral field (fringing field) is generated across the liquid crystal layer in the other. Therefore, the torque due to voltage application acts on the liquid crystal molecules in both of a rise and a fall, whereby good response characteristics are attained.

Patent Document 3 also proposes a liquid crystal display device which realizes a rapid response by allowing the alignment regulating force of an electric field to act on the liquid crystal molecules in both a rise and a fall.

CITATION LIST

Patent Literature

[Patent Document 1] Japanese National Phase PCT Laid-Open Publication No. 2006-523850

[Patent Document 2] Japanese Laid-Open Patent Publication No. 2002-365657

[Patent Document 3] International Publication No. 2013/001979

SUMMARY OF INVENTION

Technical Problem

However, it has been found that when such liquid crystal display devices as are disclosed in Patent Documents 1, 2 and 3 are used for a see-through display, the problem of background blur (it being perceived as double images) occurs for reasons that are described in detail later, thus deteriorating the display quality. Note that Patent Documents 1, 2 and 3 themselves fail to mention any such use (i.e., application to a see-through display); the aforementioned problem is a new finding by the inventors.

The present invention has been made in view of the above problems, and an objective thereof is to provide a liquid crystal display device which excels in both response characteristics and display quality, the liquid crystal display device being suitable for use as a see-through display.

Solution to Problem

A liquid crystal display device according to an embodiment of the present invention is a liquid crystal display device comprising a liquid crystal display panel including a first substrate and a second substrate opposing each other and a liquid crystal layer provided between the first substrate and the second substrate, the liquid crystal display device having a plurality of pixels arranged in a matrix array, wherein, the first substrate includes a first electrode provided for each of the plurality of pixels, and a second electrode for generating a lateral field across the liquid crystal layer in cooperation with the first electrode; the second substrate includes a third electrode opposing the first electrode and the second electrode for generating a vertical field across the liquid crystal layer in cooperation with the first electrode and the second electrode; each of the plurality of pixels is capable of switchably presenting a black displaying state where black displaying is performed with a vertical field being generated across the liquid crystal layer, a white displaying state where white displaying is performed with a lateral field being generated across the liquid crystal layer, or a transparent displaying state where a rear face side of the liquid crystal display panel is visible in a see-through manner with no voltage being applied to the liquid crystal layer; the first electrode includes a plurality of linear portions; and the plurality of linear portions are arranged so that at least one of the following exists in a plurality: the direction that the linear portions extend and the pitch of the linear portions.

In one embodiment, the plurality of linear portions are arranged so that both the direction that the linear portions extend and the pitch of the linear portions exist in pluralities.

In one embodiment, the plurality of linear portions are arranged so that at least the direction that the linear portions extend exists in a plurality; and the plurality of linear portions include two or more linear portions extending along a first direction and two or more linear portions extending along a second direction which is substantially orthogonal to the first direction.

In one embodiment, the plurality of linear portions further include two or more linear portions extending along a third direction which is inclined with respect to each of the first direction and the second direction.

In one embodiment, the plurality of linear portions are arranged so that three or more directions exist as the direction that the linear portions extend.

In one embodiment, the plurality of linear portions are arranged so that three or more pitches of the linear portions exist.

In one embodiment, in the transparent displaying state, liquid crystal molecules in the liquid crystal layer take a twist alignment.

In one embodiment, the first electrode is provided via an insulating layer on the second electrode.

In one embodiment, the liquid crystal layer contains liquid crystal molecules having positive dielectric anisotropy.

In one embodiment, the liquid crystal display device of the above construction further comprises an illumination element capable of switchably irradiating the liquid crystal display panel with a plurality of color rays including red light, green light, and blue light.

In one embodiment, the liquid crystal display device of the above construction performs multicolor displaying by a field sequential method.

In one embodiment, the liquid crystal display panel includes no color filters.

Advantageous Effects of Invention

According to an embodiment of the present invention, there is provided a liquid crystal display device which excels in both response characteristics and display quality, the liquid crystal display device being suitable for use as a see-through display.

BRIEF DESCRIPTION OF DRAWINGS

FIG. 5 A cross-sectional view showing an alignment of liquid crystal molecules 31 in a white displaying state of the liquid crystal display device 100.

FIG. 6 A cross-sectional view showing an alignment of liquid crystal molecules 31 in a transparent displaying state of the liquid crystal display device 100.

FIG. 11 (a) is a diagram schematically showing how a viewer V may observe the background via the liquid crystal display device 900 in a white/intermediate level displaying state; and (b) is a diagram schematically showing how a viewer V may observe the background via the liquid crystal display device 100 in a white/intermediate level displaying state.

FIG. 12 (a) and (b) are a perspective view and a cross-sectional view schematically showing another construction for the liquid crystal display device 100.

FIG. 19 (a) is a diagram schematically showing how a viewer V may observe the background via the liquid crystal display device 400 in a transparent displaying state; and (b) is a diagram schematically showing how a viewer V may observe the background via the liquid crystal display device 400 in a white/intermediate level displaying state.

FIG. 20 A diagram showing a text image which was used in studying the effects of an embodiment of the present invention.

FIG. 21 A diagram schematically showing a bright-dark pattern to appear in each pixel in a white displaying state or an intermediate level displaying state.

FIG. 22 A diagram showing a text image as observed via a see-through display having its combteeth arranged with a single pitch of 8 μm.

FIG. 23 A diagram showing a text image as observed via a see-through display having its combteeth arranged with two pitches of 8 μm and 12 μm.

FIG. 24 A diagram showing a text image as observed via a see-through display having its combteeth arranged with a pitch of 12 μm along the vertical direction and a pitch of 8 μm along the horizontal direction.

FIG. 25 A diagram showing a text image as observed via a see-through display having its combteeth arranged so that two pitches of 8 μm and 12 μm are mixedly present along each of the vertical direction and the horizontal direction.

FIG. 26 A diagram showing a text image as observed via a see-through display having its combteeth arranged so that four pitches of 6 μm, 8 μm, 10 μm and 12 μm are mixedly present along each of the vertical direction, the horizontal direction, and oblique directions.

DESCRIPTION OF EMBODIMENTS

Hereinafter, embodiments of the present invention will be described with reference to the drawings. Note that the present invention is not limited to the following embodiments.

Embodiment 1

Figure 1:
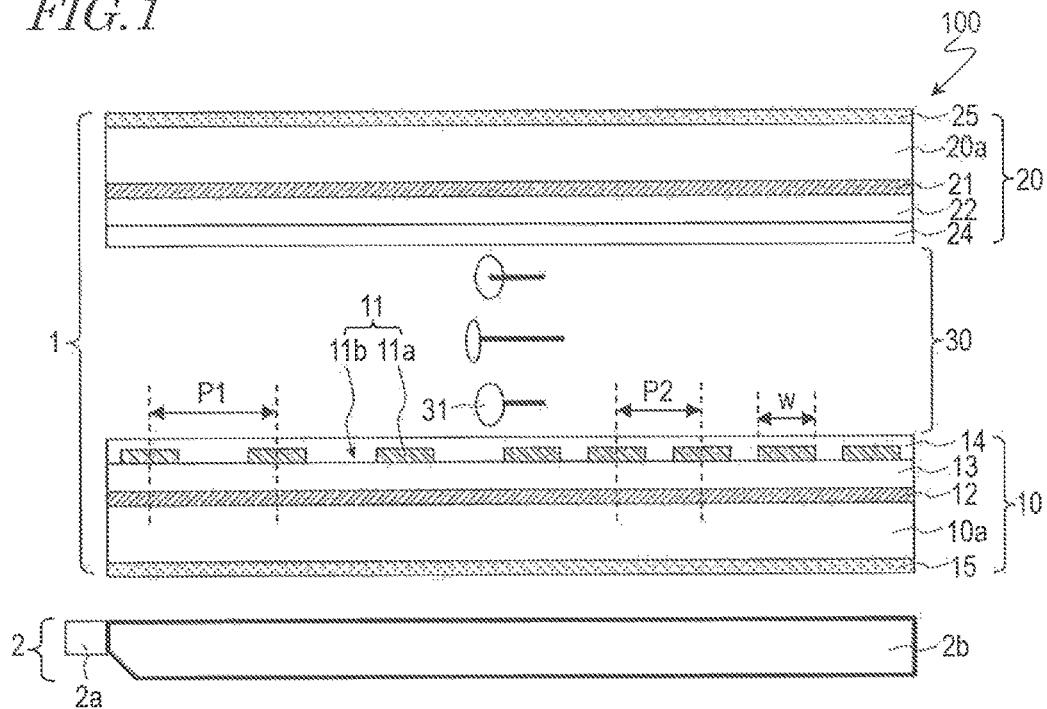
FIG. 1 A cross-sectional view schematically showing a liquid crystal display device 100 according to an embodiment of the present invention, illustrating a cross section along line 1A-1A in FIG. 2.
Figure 2:
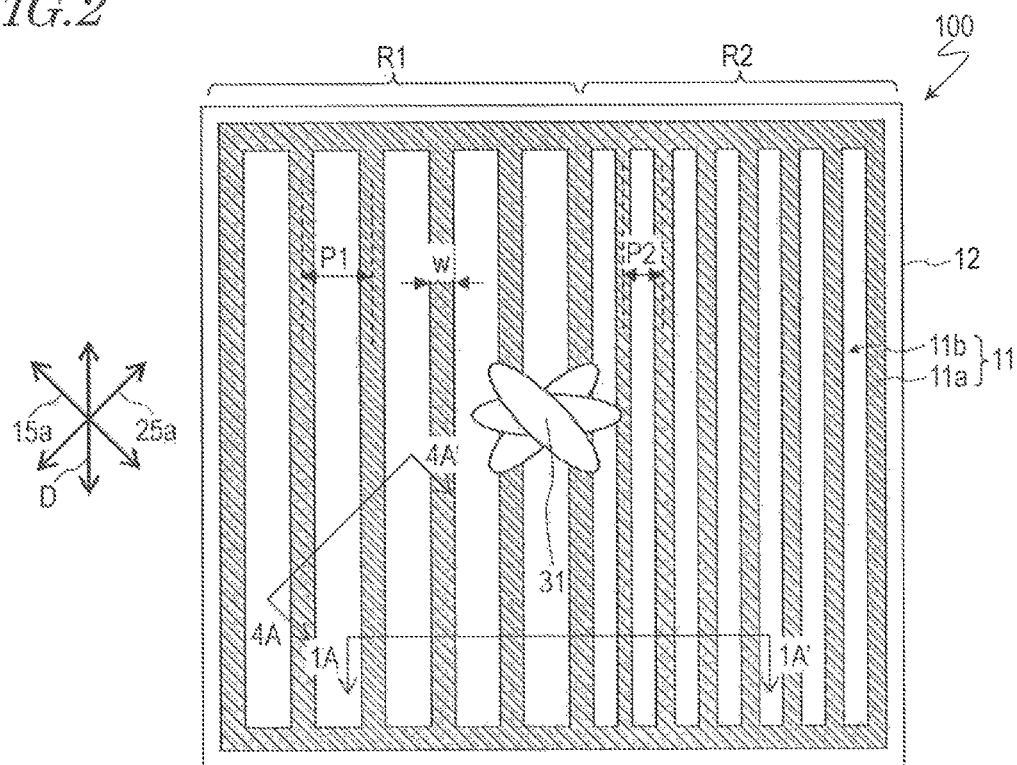
FIG. 2 A plan view schematically showing the liquid crystal display device 100, illustrating a region corresponding to one pixel.

With reference to FIG. 1 and FIG. 2, a liquid crystal display device 100 according to the present embodiment will be described. FIG. 1 and FIG. 2 are, respectively, a cross-sectional view and a plan view schematically showing the liquid crystal display device 100. FIG. 2 illustrates a region corresponding to one pixel, whereas FIG. 1 illustrates a cross section along line 1A-1A' in FIG. 2.

As shown in FIG. 1, the liquid crystal display device 100 includes a liquid crystal display panel 1 and an illumination element 2. Moreover, the liquid crystal display device 100 includes a plurality of pixels arranged in a matrix array. As will be described later, the liquid crystal display device 100 performs multicolor displaying by the field sequential method.

The liquid crystal display panel 1 includes a first substrate 10 and a second substrate 20 opposing each other, and a liquid crystal layer 30 interposed between the first substrate 10 and the second substrate 20. Hereinafter, between the first substrate 10 and the second substrate 20, the first substrate 10 being positioned relatively on the rear face side will be referred to as the "rear substrate", and the second substrate 20 being positioned relatively on the front face side (the viewer's side) will be referred to as the "front substrate".

The rear substrate 10 includes a first electrode 11 provided for each of the plurality of pixels and a second electrode 12 which cooperates with the first electrode 11 to generate a lateral field across the liquid crystal layer 30. Via an insulating layer 13, the first electrode 11 is located on the second electrode 12. Stated otherwise, the second electrode 12 is located under the first electrode 11 via the insulating layer 13. Hereinafter, between the first electrode 11 and the second electrode 12, the first electrode 11 taking a relatively upper position will be referred to as the "upper electrode", and the second electrode 12 taking a relatively lower position will be referred to as the "lower electrode". The lower electrode 12, insulating layer 13, and the upper electrode 11 are supported by an insulative transparent substrate (e.g., a glass substrate) 10a.

As shown in FIG. 1 and FIG. 2, the upper electrode 11 is interdigitated electrodes which include a plurality of linear portions (combteeth) 11a and a plurality of slits 11b. The plurality of linear portions 11a extend along a predetermined direction D. Hereinafter, the direction that the linear portions 11a extend may be referred to as the "combtooth direction". Each of the plurality of slits 11b is formed between two adjacent linear portions 11a. The upper electrode 11 is made of a transparent electrically conductive material (e.g., ITO).

In the present embodiment, the plurality of linear portions 11a are arranged so as to result in a plurality of (specifically, two) pitches (which hereinafter may be referred to the "combteeth pitches"). In other words, each pixel has a first region R1 in which two or more linear portions 11a are arranged at a relatively large first pitch P1 and a second region R2 in which they are arranged at a relatively small second pitch P2. The first pitch P1 may be e.g. 12 μm, and the second pitch P2 may be e.g. 8 μm. It will be appreciated that the first pitch P1 and the second pitch P2 are not limited to the values exemplified herein.

Note that the numbers of linear portions 11a and slits 11b are not limited to the examples shown in FIG. 1 and FIG. 2. There is no particular limitation as to the width w of each linear portion 11a. The width w of each linear portion 11a is typically not less than 2 μm and not more than 8 μm.

The lower electrode 12 has no slits. That is, the lower electrode 12 is a so-called spread electrode. The lower electrode 12 is made of a transparent electrically conductive material (e.g., ITO).

There is no particular limitation as to the material of the insulating layer 13. As the material of the insulating layer 13, for example, an inorganic material such as silicon oxide ($SiO_2$) or silicon nitride ($SiN_x$), or an organic material such as a photo-sensitive resin can be used.

The front substrate 20 includes a third electrode (hereinafter referred to as the "counter electrode") 21 which opposes the upper electrode (first electrode) 11 and the lower electrode (second electrode) 12. In the construction illustrated in FIG. 1, a dielectric layer (overcoat layer) 22 is formed on the counter electrode 21. The counter electrode 21 and the overcoat layer 22 are supported by an insulative transparent substrate (e.g., a glass substrate) 20a.

The counter electrode 21 generates a vertical field across the liquid crystal layer 30 in cooperation with the upper electrode 11 and the lower electrode 12. The counter electrode 21 is made of a transparent electrically conductive material (e.g., ITO).

The overcoat layer 22 is provided in order to weaken a vertical field which will inevitably occur when a lateral field is generated. The overcoat layer 22 is made of a photo-sensitive resin, for example.

The liquid crystal layer 30 contains liquid crystal molecules 31 having positive dielectric anisotropy. In other words, the liquid crystal layer 30 is made of a positive type liquid crystal material. Note that the orientation directions of the liquid crystal molecules 31 shown in FIG. 1 and FIG. 2 are those in a state where no voltage is applied to the liquid crystal layer 30.

The liquid crystal display panel 1 further includes a pair of horizontal alignment films 14 and 24 which oppose each other via the liquid crystal layer 30. One (which hereinafter may be referred to as the "first horizontal alignment film") 14 of the pair of horizontal alignment films 14 and 24 is formed on a surface of the rear substrate 10 that faces the liquid crystal layer 30. The other (which hereinafter may be referred to as the "second horizontal alignment film") 24 of the pair of horizontal alignment films 14 and 24 is formed on a surface of the front substrate 20 that faces the liquid crystal layer 30.

The first horizontal alignment film 14 and the second horizontal alignment film 24 have each been subjected to an alignment treatment, thus possessing an alignment regulating force that causes the liquid crystal molecules 31 in the liquid crystal layer 30 to be aligned in a predetermined direction (called a "pretilt direction"). As the alignment treatment, for example, a rubbing treatment or a photo-alignment treatment is conducted.

The pretilt direction defined by each of the first horizontal alignment film 14 and the second horizontal alignment film 24 is set so that the liquid crystal molecules 31 will take a twist alignment in a state where no voltage is applied to the liquid crystal layer 30 (i.e., a state where no electric field is generated). Specifically, the pretilt direction defined by each of the first horizontal alignment film 14 and the second horizontal alignment film 24 constitutes an angle of substantially 45° with the direction (combtooth direction) D that the linear portions 11a of the upper electrode 11 extend. Moreover, the pretilt direction that is defined by the second horizontal alignment film 24 constitutes an angle of 90° with the pretilt direction that is defined by the first horizontal alignment film 14. Therefore, in a state where no voltage is applied to the liquid crystal layer 30, the liquid crystal molecules 31 take a 90° twisted alignment.

Moreover, the liquid crystal display panel 1 further includes a pair of polarizing plates 15 and 25 which oppose each other via the liquid crystal layer 30. A transmission axis (polarization axis) 15a of one (which hereinafter may be referred to as the "first polarizing plate") 15 of the pair of polarizing plates 15 and 25 is substantially orthogonal to a transmission axis (polarization axis) 25a of the other (which hereinafter may be referred to as the "second polarizing plate") 25, as shown in FIG. 2. In other words, the first polarizing plate 15 and the second polarizing plate 25 are placed in crossed Nicols. The respective transmission axes 15a and 25a of the first polarizing plate 15 and the second polarizing plate 25 are substantially parallel or substantially orthogonal to the pretilt directions which are respectively defined by the first horizontal alignment film 14 and the second horizontal alignment film 24. Therefore, the respective transmission axes 15a and 25a of the first polarizing plate 15 and the second polarizing plate 25 constitute angles of substantially 45° with respect to the combtooth direction D.

The illumination element (referred to as the "backlight") 2 is located on the rear face side of the liquid crystal display panel 1. The illumination element 2 is able to switchably irradiate the liquid crystal display panel 1 with a plurality of color rays including red light, green light, and blue light.

As the illumination element 2, for example, an edgelight-type backlight such as that shown in FIG. 1 can be used. The edgelight-type backlight 2 includes a light source unit 2a and a light guide plate 2b. The light source unit 2a is capable of emitting a plurality of color rays including red light, green light, and blue light. For example, the light source unit 2a includes a red LED, a green LED, and a blue LED. The light guide plate 2b guides color rays which are emitted from the light source unit 2a to the liquid crystal display panel 1.

The liquid crystal display device 100 performs multicolor displaying by the field sequential method. Therefore, the liquid crystal display panel 1 lacks color filters.

When a predetermined voltage is applied between the upper electrode 11 and the lower electrode 12 (i.e., a predetermined potential difference is introduced therebetween), a lateral field (fringing field) is generated across the liquid crystal layer 30. A "lateral field" is an electric field containing a component which is substantially parallel to the substrate plane. The direction of the lateral field which is generated by the upper electrode 11 and the lower electrode 12 is substantially orthogonal to the combtooth direction D.

On the other hand, when a predetermined voltage is applied between the counter electrode 21 and the upper electrode 11 and lower electrode 12 (i.e., a predetermined potential difference is introduced therebetween), a vertical field is generated. A "vertical field" is an electric field whose direction is substantially parallel to the substrate-plane normal direction.

The liquid crystal display device 100 is constructed so that the intensities of the lateral field and the vertical field can be controlled with respect to each pixel. Typically, the liquid crystal display device 100 is constructed so that a voltage differing from pixel to pixel can be respectively supplied for the upper electrode 11 and the lower electrode 12. Specifically, both the upper electrode 11 and the lower electrode 12 are formed in isolated pieces corresponding to pixels, such that each pixel has a switching element (e.g., a thin film transistor; not shown) electrically connected to the upper electrode 11 and a switching element (e.g., a thin film transistor; not shown) electrically connected to the lower electrode 12. A predetermined voltage is supplied to each of the upper electrode 11 and the lower electrode 12 via a corresponding switching element. Moreover, the counter electrode 21 is formed as a single electrically conductive film that is continuous across all pixels. Therefore, a common potential is applied to the counter electrode 21 for all pixels.

Figure 3:
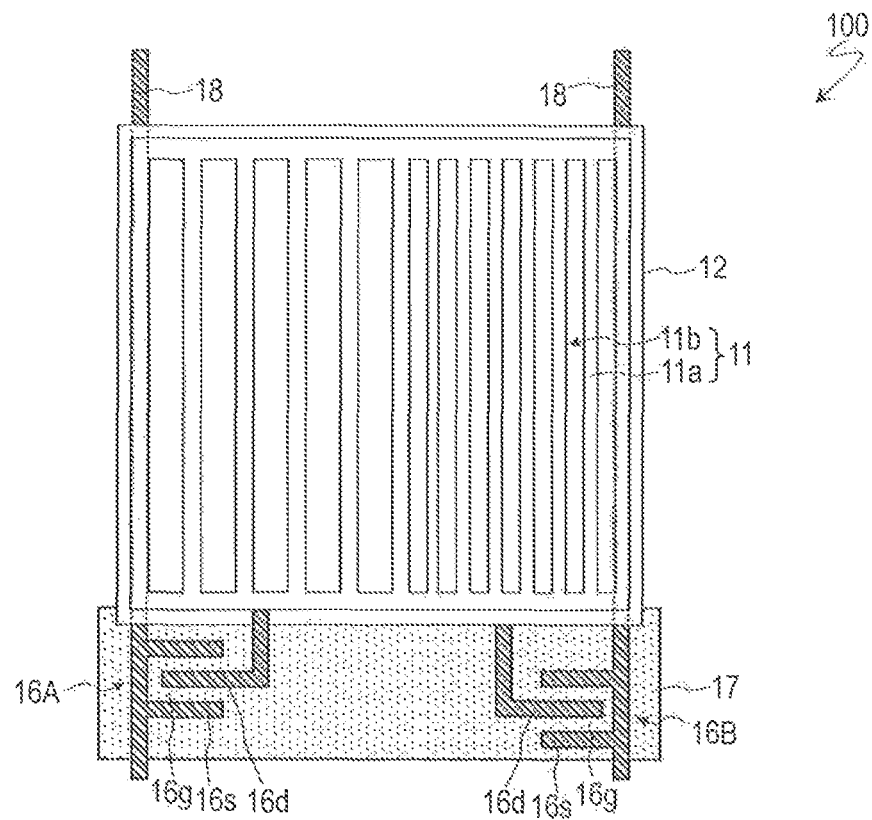
FIG. 3 A plan view showing a specific exemplary wiring structure for a rear substrate 10 of the liquid crystal display device 100.

FIG. 3 shows an exemplary of a specific wiring structure for the rear substrate 10. In the construction shown in FIG. 3, a first TFT 16A corresponding to the upper electrode 11 and a second TFT 16B corresponding to the lower electrode 12 are provided for each pixel.

The respective gate electrodes 16g of the first TFT 16A and the second TFT 16B are electrically connected to a gate bus line (scanning line) 17. Herein, the portions of the gate bus line 17 that overlap the channel regions of the first TFT 16A and the second TFT 16B function as the gate electrodes 16g. Respective source electrodes 16s of the first TFT 16A and the second TFT 16B are electrically connected to source bus lines (signal lines) 18. Herein, portions branching out from the source bus lines 18 function as the source electrodes 16s. A drain electrode 16d of the first TFT 16A is electrically connected to the upper electrode 11. On the other hand, a drain electrode 16d of the second TFT 16B is electrically connected to the lower electrode 12. Note that the wiring structure of the rear substrate 10 is not limited to what is exemplified in FIG. 3.

In the liquid crystal display device 100 of the present embodiment, each of the plurality of pixels is able to switchably present: a "black displaying state", where black displaying is performed with a vertical field being generated across the liquid crystal layer 30; a "white displaying state", where white displaying is performed with a lateral field being generated across the liquid crystal layer 30; or a "transparent displaying state", where the rear face side (i.e., the background) of the liquid crystal display panel 1 is visible in a see-through manner with no voltage being applied to the liquid crystal layer 30.

Hereinafter, with reference to FIG. 4, FIG. 5 and FIG. 6, the black displaying state, the white displaying state, and the transparent displaying state will be described in more detail. Each of FIG. 4, FIG. 5 and FIG. 6 is a cross-sectional view along line 4A-4A' in FIG. 2.

Figure 4:
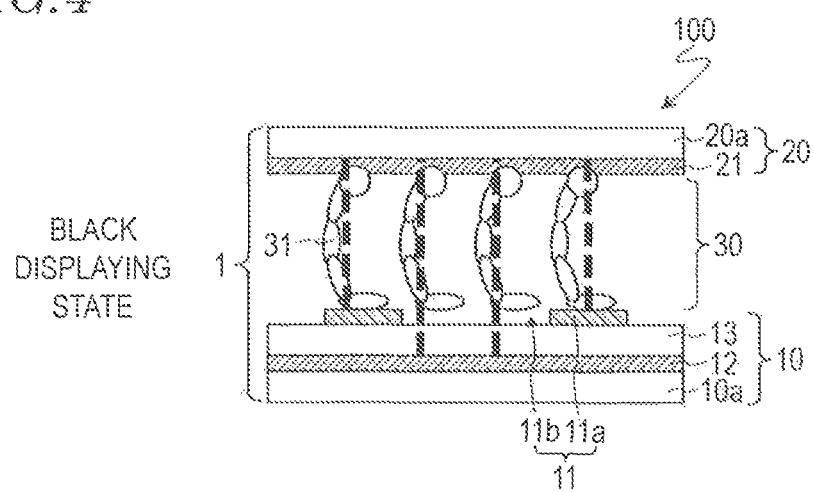
FIG. 4 A cross-sectional view showing an alignment of liquid crystal molecules 31 in a black displaying state of the liquid crystal display device 100.

FIG. 4 shows an alignment of liquid crystal molecules 31 in a black displaying state. In the black displaying state, a predetermined voltage is applied between the counter electrode 21 and the upper electrode 11 and lower electrode 12 (e.g., a potential of 0 V being given to the counter electrode 21 and a potential of 7.5 V being given to the upper electrode 11 and lower electrode 12), whereby a vertical field is generated across the liquid crystal layer 30. FIG. 4 schematically shows the electric lines of force in this state with broken lines.

In this black displaying state, as shown in FIG. 4, the liquid crystal molecules 31 in the liquid crystal layer 30 are aligned substantially vertically to the substrate plane (the surfaces of the rear substrate 10 and the front substrate 20) (i.e., substantially parallel to the layer normal direction of the liquid crystal layer 30). Note that the liquid crystal molecules 31 in the close neighborhood of the first horizontal alignment film 14 and the second horizontal alignment film 24 are strongly affected by the alignment regulating forces of the first horizontal alignment film 14 and the second horizontal alignment film 24, and therefore remain aligned substantially parallel to the substrate plane. However, since these liquid crystal molecules 31 are substantially parallel or substantially orthogonal to the transmission axis 15a of the first polarizing plate 15, they hardly confer any phase difference to the light passing through the first polarizing plate 15 and entering the liquid crystal layer 30, and thus hardly lower the contrast ratio.

FIG. 5 shows an alignment of liquid crystal molecules 31 in the white displaying state. In the white displaying state, a predetermined voltage is applied between the upper electrode 11 and the lower electrode 12 (e.g., a potential of 0 V being given to the upper electrode 11 and the counter electrode 21, and a potential of 7.5 V being given to the lower electrode 12), thereby generating a lateral field (fringing field) across the liquid crystal layer 30. FIG. 5 schematically shows the electric lines of force in this state with broken lines.

In this white displaying state, as shown in FIG. 5, the liquid crystal molecules 31 in the liquid crystal layer 30 are aligned substantially in parallel to the substrate plane (i.e., substantially vertically to the layer normal direction of the liquid crystal layer 30). More specifically, the liquid crystal molecules 31 in the neighborhood of first horizontal alignment film 14 and the liquid crystal molecules 31 in the neighborhood of second horizontal alignment film 24 are aligned so as to constitute an angle of substantially 90°, whereby the liquid crystal molecules 31 near the center along the thickness direction of the liquid crystal layer 30 are aligned substantially orthogonal to the direction (combtooth direction) D that the linear portions 11a of the upper electrode 11 extend. Therefore, an average orientation direction of the bulk liquid crystal is substantially orthogonal to the combtooth direction D (i.e., constituting an angle of substantially 45° with respect to the respective transmission axes 15a and 25a of the first polarizing plate 15 and the second polarizing plate 25).

FIG. 6 shows an alignment of liquid crystal molecules 31 in the transparent displaying state. In the transparent displaying state, no voltage is applied to the liquid crystal layer 30 (e.g., a potential of 0 V is given to all of the upper electrode 11, the lower electrode 12, and the counter electrode 21), so that neither a vertical field nor a lateral field is generated across the liquid crystal layer 30.

In this transparent displaying state, the liquid crystal molecules 31 in the liquid crystal layer 30 take a twist alignment, as shown in FIG. 6. In other words, the liquid crystal molecules 31 are aligned substantially in parallel to the substrate plane (i.e., substantially vertically to the layer normal direction of the liquid crystal layer 30). The liquid crystal molecules 31 in the neighborhood of first horizontal alignment film 14 and the liquid crystal molecules 31 in the neighborhood of second horizontal alignment film 24 are aligned so as to constitute an angle of substantially 90°, whereby the liquid crystal molecules 31 near the center along the thickness direction of the liquid crystal layer 30 are aligned substantially orthogonal to the combtooth direction D. Therefore, an average orientation direction of the liquid crystal molecules 31 in the bulk liquid crystal are substantially orthogonal to the combtooth direction D (i.e., constituting an angle of substantially 45° with respect to the respective transmission axes 15a and 25a of the first polarizing plate 15 and the second polarizing plate 25). The light transmittance of each pixel of the liquid crystal display device 100 is the highest in this transparent displaying state (i.e., higher than those in the black displaying state and the white displaying state).

As described above, the liquid crystal display device 100 of the present embodiment performs multicolor displaying by the field sequential method, so that the liquid crystal display panel 1 does not need color filters. Therefore, the efficiency of light utilization is improved. Moreover, in the liquid crystal display device 100, a vertical field is generated across the liquid crystal layer 30 in the black displaying state and a lateral field is generated across the liquid crystal layer 30 in the white displaying state; therefore, torque due to voltage application can act on the liquid crystal molecules 31 in both a fall (i.e., a transition from the white displaying state to the black displaying state) and a rise (i.e., a transition from the black displaying state to the white displaying state). As a result, good response characteristics are attained.

Furthermore, in the liquid crystal display device 100 of the present embodiment, each pixel is capable of presenting not only the black displaying state and the white displaying state, but also the transparent displaying state, which is a state where no voltage is applied to the liquid crystal layer 30. By displaying the background in this transparent displaying state, it becomes possible to prevent the problem of background blur (it being perceived as double images). Hereinafter, the reasons why this (doubling blur) would occur in the liquid crystal display devices of Patent Documents 1 to 3 will be described with reference to liquid crystal display devices of Comparative Examples.

FIGS. 7(a) and (b) show a liquid crystal display device 800 of Comparative Example 1 in, respectively, a state of black displaying and a state of white displaying. The liquid crystal display device 800 of Comparative Example 1 has the same construction as that of the liquid crystal display device of Patent Document 3 as shown in FIG. 1 and FIG. 2.

The liquid crystal display device 800 includes an array substrate 810 and a counter substrate 820, and a liquid crystal layer 830 provided therebetween. The array substrate 810 includes a glass substrate 810a, as well as a lower electrode 812, an insulating layer 813, and a pair of interdigitated electrodes (upper electrode) 817 and 818, which are stacked on the glass substrate 810a in this order. On the other hand, the counter substrate 820 includes a glass substrate 820a and a counter electrode 821 formed on the glass substrate 820a.

The liquid crystal layer 830 contains liquid crystal molecules 831 having positive dielectric anisotropy. In the liquid crystal display device 800, the liquid crystal molecules 831 in the liquid crystal layer 830 take a vertical alignment state in the absence of an applied voltage.

Figure 7:
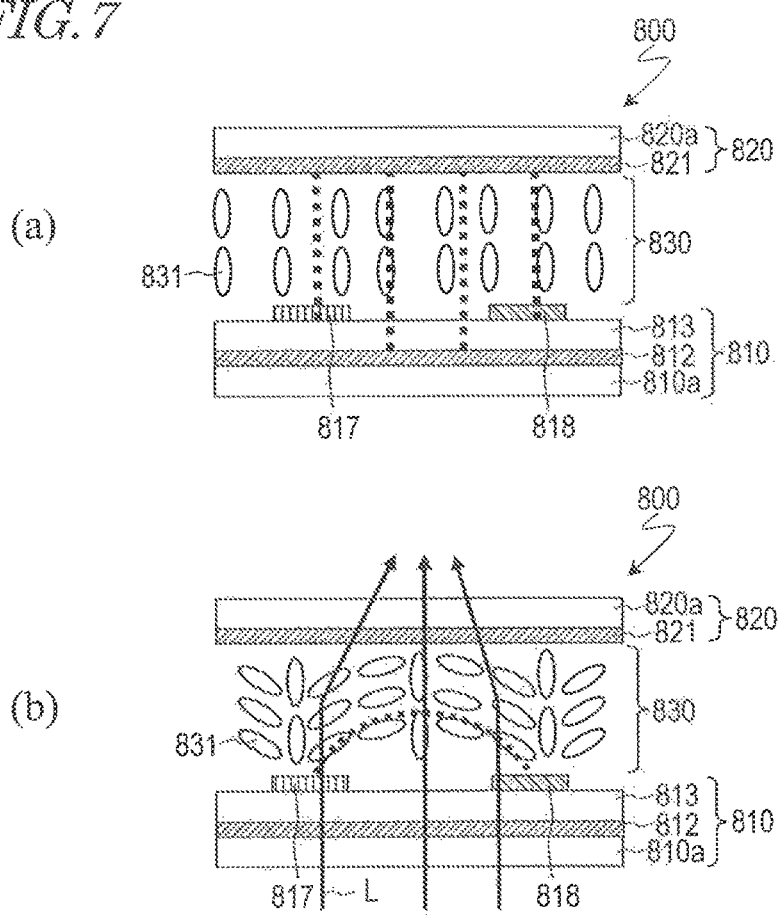
FIGS. 7 (a) and (b) are cross-sectional views schematically showing a liquid crystal display device 800 of Comparative Example 1, where (a) shows a state of black displaying, and (b) shows a state of white displaying.

In the liquid crystal display device 800 of Comparative Example, when performing black displaying, a predetermined voltage is applied between the counter electrode 821 and the lower electrode 812 and upper electrode (a pair of interdigitated electrodes) 817 and 818 (for example, a potential of 7 V may be given to the counter electrode 821, while a potential of 14 V may be given to the lower electrode 812 and the upper electrode 817, 818), thereby generating a vertical field across the liquid crystal layer 830. As a result, the liquid crystal molecules 831 become aligned substantially vertically to the substrate plane, as shown in FIG. 7(*a*).

On the other hand, when conducting white displaying in the liquid crystal display device 800 of Comparative Example, a predetermined voltage is applied between the pair of interdigitated electrodes 817 and 818 (for example, a potential of 0 V may be given to one of the interdigitated electrodes 817, while a potential of 14 V may be given to the other interdigitated electrode 818), thereby generating a lateral field across the liquid crystal layer 830. Thus, as shown in FIG. 7(*b*), the liquid crystal molecules 831 take an alignment which is inclined with respect to the substrate plane normal direction.

In the case where the liquid crystal display device 800 of Comparative Example 1 is simply used for a see-through display, if see-through displaying were to be conducted, i.e., when conducting displaying such that the background is visible in a see-through manner, the white displaying state will be utilized, which is a state under high pixel light transmittance. However, the state for conducting white displaying is a state in which the liquid crystal molecules 831 are aligned by applying a voltage across the liquid crystal layer 830, so that a refractive index distribution occurs within the pixel. Therefore, light L from the rear face side is scattered due to this refractive index distribution (i.e., the direction of travel of the light L changes; see FIG. 7(*b*)), thus blurring the background. Consequently, a viewer observing the background via the see-through display will perceive the background as double images.

Figure 8:
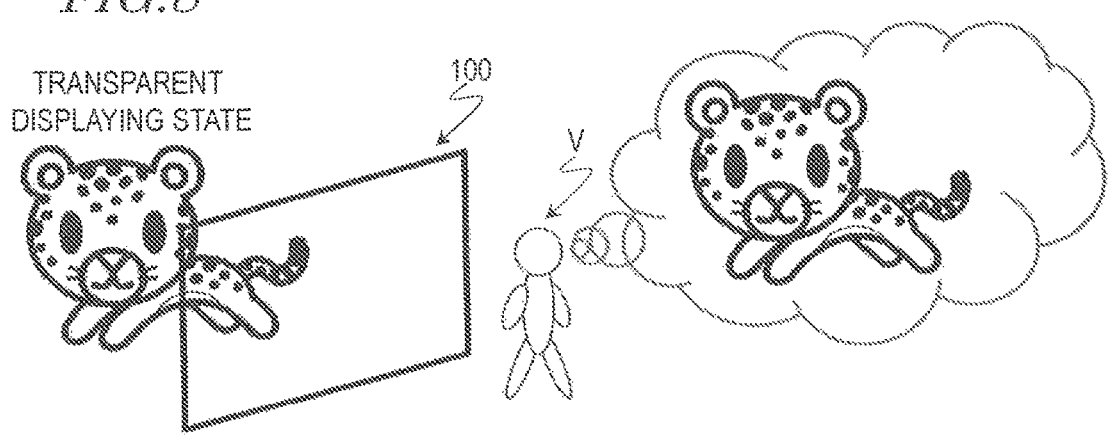
FIG. 8 A diagram schematically showing how a viewer V may observe the background via the liquid crystal display device 100 in a transparent displaying state.

Thus, doubling blur will occur when see-through displaying is conducted in the white displaying state, which is a state where voltage is applied across the liquid crystal layer. On the other hand, in the liquid crystal display device 100 of the present embodiment, the background (see-through displaying) is displayed in pixels which are in a state where no voltage is applied to the liquid crystal layer 30 (transparent displaying state), whereby the viewer V observing the background via the liquid crystal display device 100 will vividly perceive the background, as shown in FIG. 8. As a result, doubling blur is prevented, and the quality of see-through displaying improves.

Note that each of the plurality of pixels of the liquid crystal display device 100 is able to present an "intermediate level displaying state" of presenting a luminance corresponding to an intermediate gray scale level, in addition to the black displaying state of presenting a luminance corresponding to the lowest gray scale level, the white displaying state of presenting a luminance corresponding to the highest gray scale level, and the transparent displaying state of conducting see-through displaying. In an intermediate level displaying state, desired transmittance can be realized by adjusting the intensity of the lateral field (fringing field) to be generated across the liquid crystal layer 30 (e.g., a potential of 0 V being given to the counter electrode 21 and that of 7.5 V being given to the lower electrode 12, and a potential which is greater than 0 V and less than 7.5 V being given to the upper electrode 11). It will be appreciated that the relationship between the potentials to be given to the upper electrode 11 and the lower electrode 12 is not limited to what is exemplified herein. For example, intermediate level displaying may be realized with a fixed potential given to the upper electrode 11 and a variable potential given to the lower electrode 12.

Moreover, in the present embodiment, liquid crystal molecules 31 in the liquid crystal layer 30 take a twist alignment in the transparent displaying state. This allows a more vivid (clearer) transparent displaying to be realized. Under a twist alignment, the liquid crystal molecules 31 are oriented in an identical direction within a plane which is parallel to the display surface; therefore, any diffraction associated with refractive index differences within the plane, or any diffraction associated with dark lines ascribable to the liquid crystal mode (i.e., dark lines caused by structures for regulating the alignment direction, or points of discontinuous alignment directions that may occur within the plane) does not occur.

As described above, the liquid crystal display device 100 of the present embodiment is able to achieve vivid transparent displaying. In a see-through display under the transparent displaying state, it is preferable for an object on the rear face side of the panel to be vividly perceived, without appearing hazy. On the other hand, in any other displaying state (i.e., the white displaying state or an intermediate level displaying state), it is preferable for an object on the rear face side of the panel to appear hazy, rather than being vividly perceived.

In the liquid crystal display device 100 of the present embodiment, the plurality of linear portions (combteeth) 11*a* of the upper electrode (interdigitated electrodes) 11 are arranged so as to result in a plurality of pitches. This ensures that, in displaying states other than the transparent displaying state, an object on the rear face side of the liquid crystal display panel 1 is difficult to be perceived. Hereinafter, reasons thereof will be described through comparison with a liquid crystal display device 900 of Comparative Example 2 shown in FIG. 9 and FIG. 10.

Figure 9:
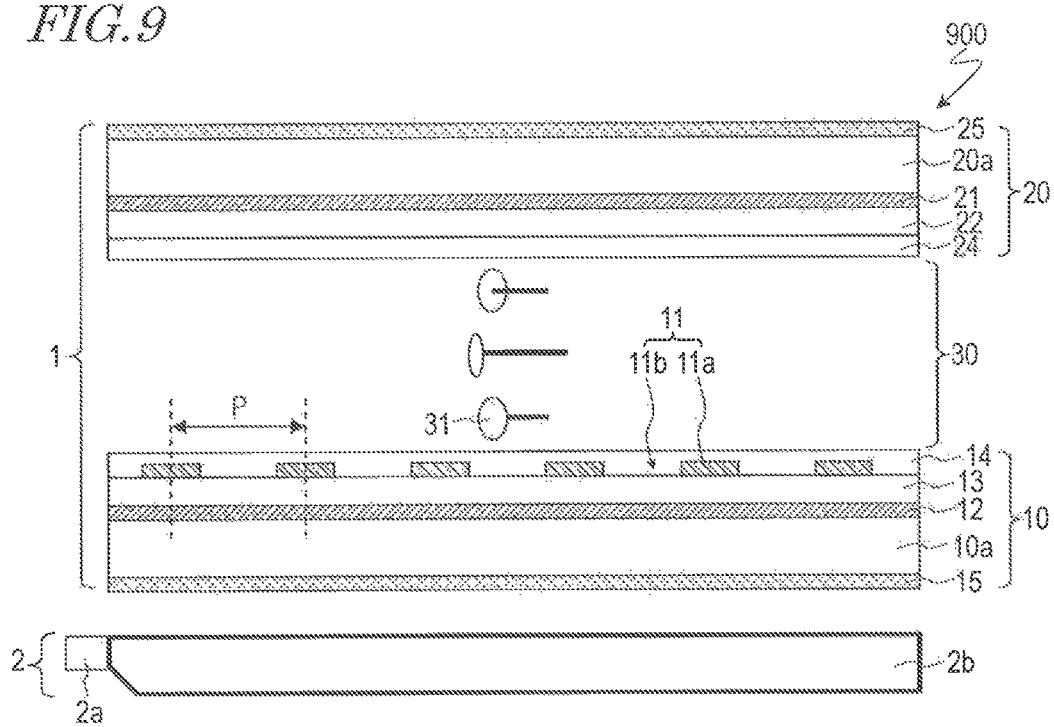
FIG. 9 A cross-sectional view schematically showing a liquid crystal display device 900 of Comparative Example 2, illustrating a cross section along line 9A-9A' in FIG. 10.
Figure 10:
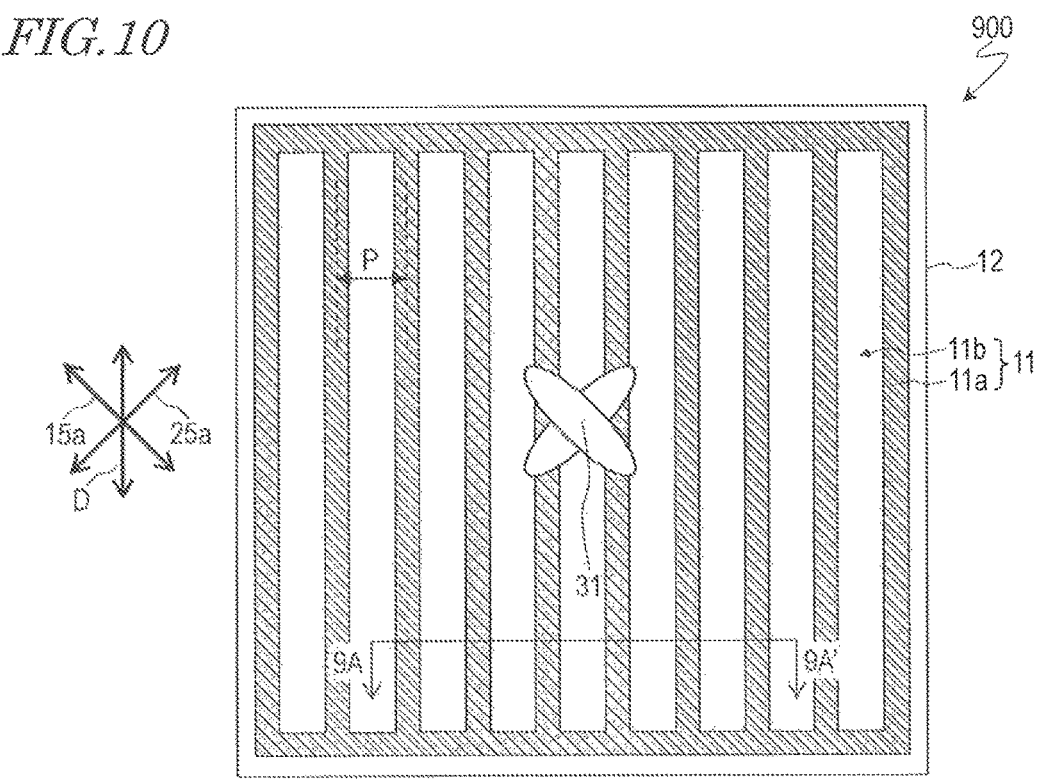
FIG. 10 A plan view schematically showing the liquid crystal display device 900, illustrating a region corresponding to one pixel.

FIG. 9 and FIG. 10 are a cross-sectional view and a plan view schematically showing the liquid crystal display device 900 of Comparative Example 2, where FIG. 9 illustrates a cross section along line 9A-9A' in FIG. 10.

As shown in FIG. 9 and FIG. 10, the liquid crystal display device 900 of Comparative Example 2 differs from the liquid crystal display device 100 of the present embodiment in that the plurality of linear portions 11*a* of the upper electrode 11 are arranged with a single pitch P.

When conducting white displaying or intermediate level displaying with the liquid crystal display device 900, alignment of the liquid crystal molecules 31 is controlled by utilizing a lateral field (fringing field) which is generated across the liquid crystal layer 30. Therefore, within the display surface, dark lines occur in regions corresponding to the slits 11*b* in the upper electrode (interdigitated electrodes) 11. These dark lines, whose pitch depends on the pitch of the linear portions 11*a* of the upper electrode 11, occur periodically. Therefore, the bright-dark pattern (periodic structure) which is formed within the pixel functions as a diffraction grating. A diffraction angle (outgoing angle of diffracted light) θ by a diffraction grating is expressed by the following equation.

$$m\lambda = d \sin \theta$$

In the above, m represents the order; λ represents the wavelength; and d represents the pitch of the periodic structure. Note that the above equation only accounts for light which is incident on the diffraction grating from the normal direction (i.e., the incident angle being 0°).

When only considering the first-order light having a strong intensity, the linear portions 11*a* of the upper electrode 11 in the liquid crystal display device 900 of Comparative Example 2 have only a single pitch (no other than P), thus resulting in one diffraction angle θ. Therefore, as shown in FIG. 11(a), the viewer V will perceive an object on the rear face side of the liquid crystal display device 900 (liquid crystal display panel 1) as distinct double images. Thus, although diffraction will induce double images, the contour of an object that is on the rear face side will still be recognized, although unclearly; this is not sufficient hazy.

On the other hand, in the liquid crystal display device 100 of the present embodiment, the linear portions 11a of the upper electrode 11 have a plurality of pitches (P1 and P2), thus resulting in a plurality of diffraction angles (i.e., two herein). Consequently, as shown in FIG. 11(b), the viewer V will see an object on the rear face side of the liquid crystal display device 100 (liquid crystal display panel 1) as being sufficiently hazy, rather than as distinct double images. Now, diffraction angles θ for first-order light will be calculated with respect to the exemplified values of pitches P1 and P2. For example, as for light having a wavelength of 550 nm, the diffraction angle θ when the pitch P1 is 12 μm is about 2.6°, and the diffraction angle θ when the pitch P2 is 8 μm is about 3.9°. The positions at which diffracted images ascribable to the pitches P1 and P2 will appear can be calculated from the distance between the liquid crystal display device 100 and an object on its rear face side, as well as the diffraction angles θ calculated through the above calculation. When the distance is 30 cm, a diffracted image ascribable to the pitch P1 of 12 μm will appear at a position which is shifted by about 1.4 cm from the original image, while a diffracted image ascribable to the pitch P2 of 8 μm will appear at a position which is shifted by about 2.0 cm from the original image. Thus, with the liquid crystal display device 100, the viewer V will see the plurality of diffracted images as well as the original image, thus allowing an object on the rear face side to be recognized as being sufficiently hazy.

As described above, the liquid crystal display device 100 of the present embodiment excels in both response characteristics and display quality, and thus is suitably used as a see-through display.

In the liquid crystal display device 100, when conducting displaying such that information which is displayed by the liquid crystal display panel 1 is overlaid on the background, the pixels in the portion of the displaying region where information is to be displayed present either the black displaying state, the white displaying state, or an intermediate level displaying state, whereas the pixels in any other portion present the transparent displaying state. These displaying states can be switched in the following manner, for example.

A driving circuit for a generic liquid crystal display device includes an 8-bit driver IC, and generates output voltages corresponding to 256 gray scale levels ($0^{th}$ to $255^{th}$ gray scale levels). In a generic liquid crystal display device, the $0^{th}$ gray scale level is assigned to the black displaying state; the $1^{st}$ to $254^{th}$ gray scale levels are assigned to intermediate level displaying states; and the $255^{th}$ gray scale level is assigned to the white displaying state.

In the liquid crystal display device 100 of the present embodiment, for example, the $0^{th}$ gray scale level may be assigned to the transparent displaying state, the $1^{st}$ gray scale level may be assigned to the black displaying state, the $2^{nd}$ to $254^{th}$ gray scale levels may be assigned to intermediate level displaying states, and the $255^{th}$ gray scale level assigned to the white displaying state, thereby being able to switch between the black displaying state, intermediate level displaying states, the white displaying state, and the transparent displaying state. Note that it is not necessary for the transparent displaying state to be associated with the $0^{th}$ gray scale level, and any gray scale level may be assigned to the transparent displaying state. In cases other than displaying in 256 gray scale levels exemplified herein, too, a specific gray scale level may be assigned to the transparent displaying state.

As described above, in the liquid crystal display device 100 of the present embodiment, each pixel is capable of switchably presenting the black displaying state, the white displaying state, or the transparent displaying state. In any conventional see-through display, regardless of its type (liquid crystal display device, PDLC display, organic EL display, etc.), see-through displaying will need to be performed in either the black displaying state or the white displaying state (i.e., the gray scale level for either the black displaying state or the white displaying state being assigned to see-through displaying), and thus see-through displaying cannot be performed with an applied voltage that differs from those of the black displaying state and the white displaying state. On the other hand, in the liquid crystal display device 100 of the present embodiment, each pixel is able to present not only the black displaying state and the white displaying state, but also the transparent displaying state, with an applied voltage which differs from those of the black displaying state and the white displaying state, whereby doubling blur is prevented. Moreover, in the liquid crystal display device 100 of the present embodiment, the linear portions (combteeth) 11a of the upper electrode (interdigitated electrodes) 11 have a plurality of pitches, so that an object on the rear face side of the liquid crystal display panel 1 is difficult to be perceived in displaying states other than the transparent displaying state.

The present embodiment illustrates as an example a construction where liquid crystal molecules 31 near the center along the thickness direction of the liquid crystal layer 30 are aligned substantially orthogonal to the combtooth direction D (that is, an average orientation direction in the bulk liquid crystal is substantially orthogonal to the combtooth direction D) in the white displaying state and in the transparent displaying state. Alternatively, a construction where liquid crystal molecules 31 near the center along the thickness direction of the liquid crystal layer 30 are aligned substantially parallel to the combtooth direction D (that is, an average orientation direction in the bulk liquid crystal is substantially parallel to the combtooth direction D) in the white displaying state and in the transparent displaying state may be adopted. However, from the standpoint of brightness of display, the former construction (which hereinafter may also be referred to as the "orthogonal type") is more preferable than the latter construction (which hereinafter may also be referred to as the "parallel type").

Figure 28:
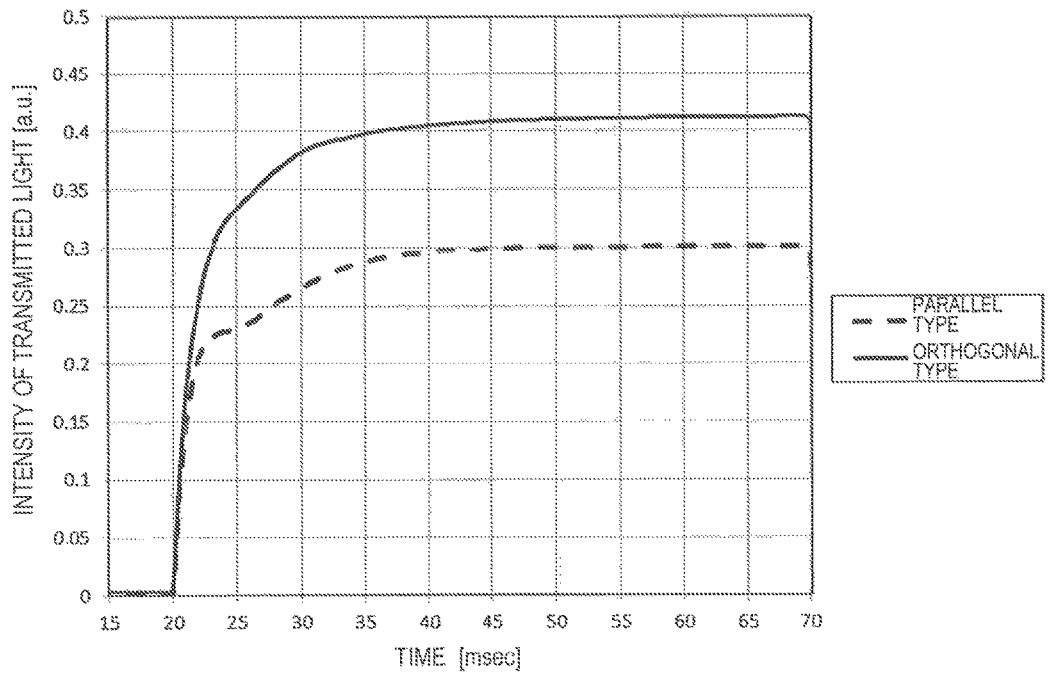
FIG. 28 A graph showing change over time in the intensity of transmitted light, in a construction where liquid crystal molecules 31 near the center along the thickness direction of the liquid crystal layer 30 are aligned substantially orthogonal to the combtooth direction D in a white displaying state and in a transparent displaying state, and in a construction where they are aligned substantially parallel to the combtooth direction D.

FIG. 28 shows change over time in the intensity of transmitted light, with respect to the case of adopting the orthogonal type and the case of adopting the parallel type. In the example shown in FIG. 28, switching from the black displaying state to the white displaying state is made at 20 msec. Herein, for example, under driving with a frame frequency of 240 Hz (1 frame being about 4.2 msec) and a backlight activation period of 50%, the period from 22.1 msec to 24.2 msec in FIG. 28 is the period in which the backlight is activated in the first frame after switching of displaying states. It can be seen that the orthogonal type is brighter than the parallel type in terms of total brightness (integrated amount) during this period.

Although FIG. 1 illustrates a construction in which an edgelight-type backlight is disposed as the illumination element 2 on the rear face side of the liquid crystal display panel 1 so as to overlap the liquid crystal display panel 1, the illumination element 2 is not to be limited to this example.

For example, a construction shown in FIG. 12 may be adopted. In the construction shown in FIG. 12, the liquid crystal display panel 1 and the illumination element 2 of the liquid crystal display device 100 are attached on a transparent case 50 of a box shape. The case 50 having the liquid crystal display panel 1 and the illumination element 2 attached thereto is used as a showcase, for example.

The liquid crystal display panel 1 is attached to a side face 50s, among a plurality of side faces of the case 50. The illumination element 2 is attached to an upper face 50t of the case 50. In a manner described above, the illumination element 2 is capable of switchably irradiating the liquid crystal display panel 1 with a plurality of color rays including red light, green light, and blue light. From the standpoint of enhancing the efficiency of light utilization (i.e., allowing as much light from the illumination element 2 to enter the liquid crystal display panel 1 as possible), it is preferable that the inner surface of the case 50 has a light diffusing property.

Embodiment 2

Figure 13:
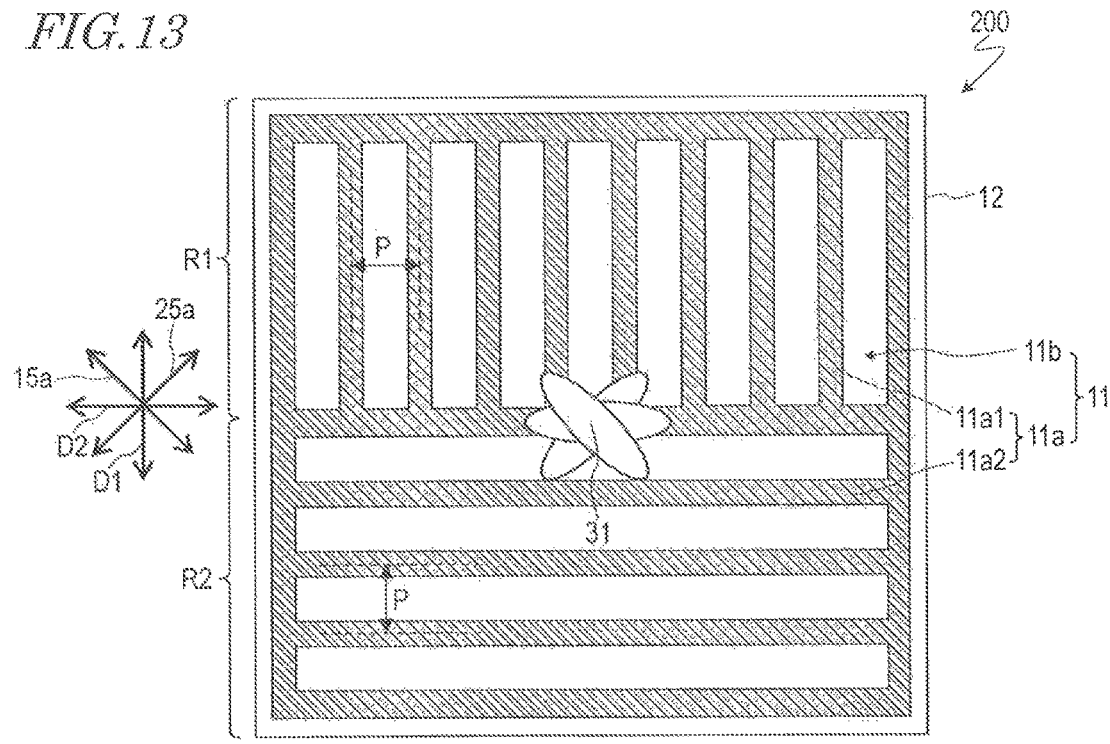
FIG. 13 A plan view schematically showing a liquid crystal display device 200 according to an embodiment of the present invention, illustrating a region corresponding to one pixel.

With reference to FIG. 13, a liquid crystal display device 100 according to the present embodiment will be described. FIG. 13 is a plan view schematically showing the liquid crystal display device 200, illustrating a region corresponding to one pixel. The following description will be mainly directed to aspects in which the liquid crystal display device 200 differs from the liquid crystal display device 100 of Embodiment 1 (the same is also true of any embodiment to follow).

In the liquid crystal display device 200 of the present embodiment, the construction of the upper electrode 11 is different from that in the liquid crystal display device 100 of Embodiment 1. In the present embodiment, the plurality of linear portions 11a of the upper electrode 11 are arranged so as to extend along a plurality of directions (specifically, two), as shown in FIG. 13. In other words, the plurality of linear portions 11a include: two or more linear portions 11a1 which extend along a first direction D1 (which herein is the vertical direction on the display surface); and two or more linear portions 11a2 which extend along a second direction D2 (which herein is the horizontal direction on the display surface) that is substantially orthogonal to the first direction D1. Thus, each pixel includes: a first region R1 in which two or more linear portions 11a1 are arranged so as to extend along the first direction D1; and a second region R2 in which two or more linear portions 11a2 are arranged so as to extend along the second direction D2. In both of the first region R1 and the second region R2, the plurality of linear portions 11a are arranged with the same pitch P.

In the liquid crystal display device 100 of Embodiment 1, the plurality of linear portions 11a of the upper electrode 11 are arranged so that there is one combtooth direction and that there are a plurality of combteeth pitches (specifically, two). On the other hand, in the liquid crystal display device 200 of the present embodiment, the plurality of linear portions 11a of the upper electrode 11 are arranged so that there is one combteeth pitch and that there are a plurality of combtooth directions (specifically, two).

In the liquid crystal display device 200, since there are a plurality of combtooth directions, in the white displaying state and in an intermediate level displaying state, a plurality of diffracted images which are shifted from the original image in mutually different directions. Specifically, in Embodiment 1, a plurality of diffracted images which are shifted along the horizontal direction from the original image appear; on the other hand, in the present embodiment, with respect to the original image, a diffracted image which is shifted along the horizontal direction and a diffracted image which is shifted along the vertical direction appear. Therefore, in the liquid crystal display device 200 of the present embodiment, too, an object on the rear face side will be recognized as being sufficiently hazy.

In the construction illustrated in FIG. 13, each of the first horizontal alignment film 14 and the second horizontal alignment film 24 is subjected to a uniform alignment treatment within the pixel. In other words, the pretilt direction that is defined by the first horizontal alignment film 14 is identical between the first region R1 and the second region R2, and the pretilt direction that is defined by the second horizontal alignment film 24 is also identical between the first region R1 and the second region R2. Therefore, in the white displaying state and in the transparent displaying state, liquid crystal molecules 31 near the center along the thickness direction of the liquid crystal layer 30 are aligned substantially orthogonal to the first direction D1 (the combtooth direction in the first region R1) in the first region R1, and aligned substantially parallel to the second direction D2 (the combtooth direction in the second region R2) in the second region R2.

Figure 14:
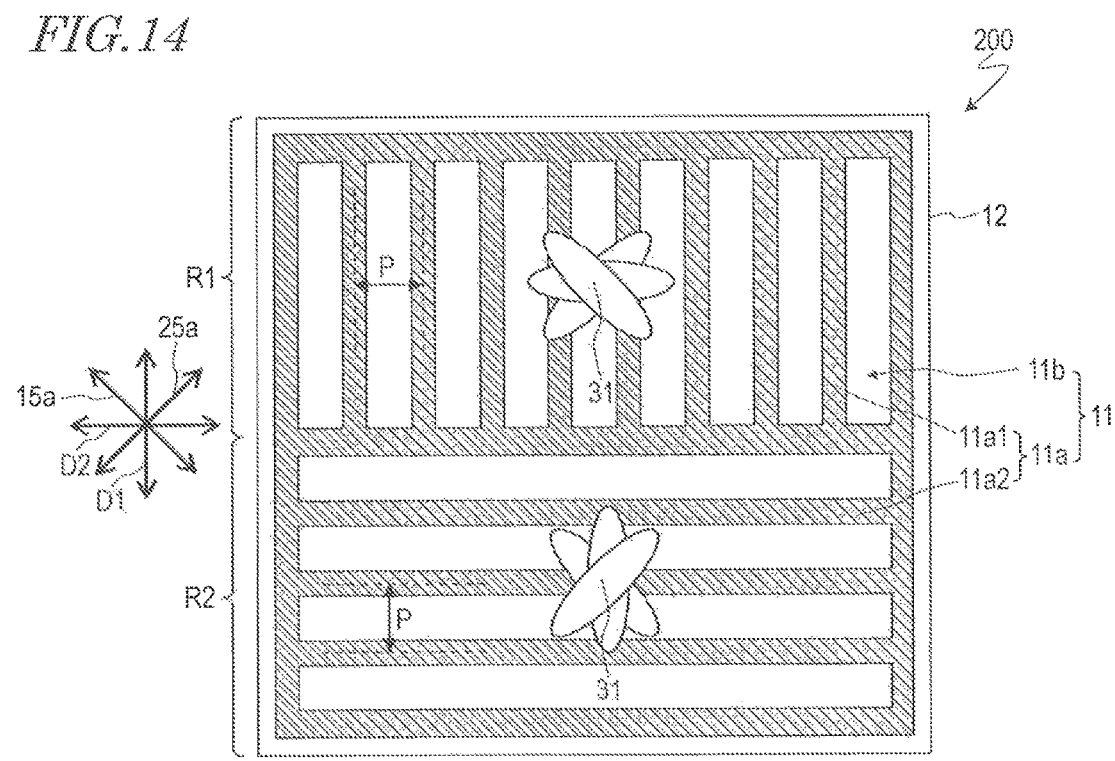
FIG. 14 A cross-sectional view schematically showing another construction for the liquid crystal display device 200.

Alternatively, a construction which is shown in FIG. 14 may be adopted. In the construction shown in FIG. 14, the pretilt direction that is defined by the first horizontal alignment film 14 differs by 90° between the first region R1 and the second region R2, and the pretilt direction that is defined by the second horizontal alignment film 24 also differs by 90° between the first region R1 and the second region R2. As a result, in the white displaying state and in the transparent displaying state, liquid crystal molecules 31 near the center along the thickness direction of the liquid crystal layer 30 in both of the first region R1 and the second region R2 are aligned substantially orthogonal to the combtooth direction (respectively, the first direction D1 and the second direction D2). When the construction which is shown in FIG. 14 is adopted, the effect of improving the brightness of display can be attained across the entire pixel (i.e., in both of the first region R1 and the second region R2).

Embodiment 3

Figure 15:
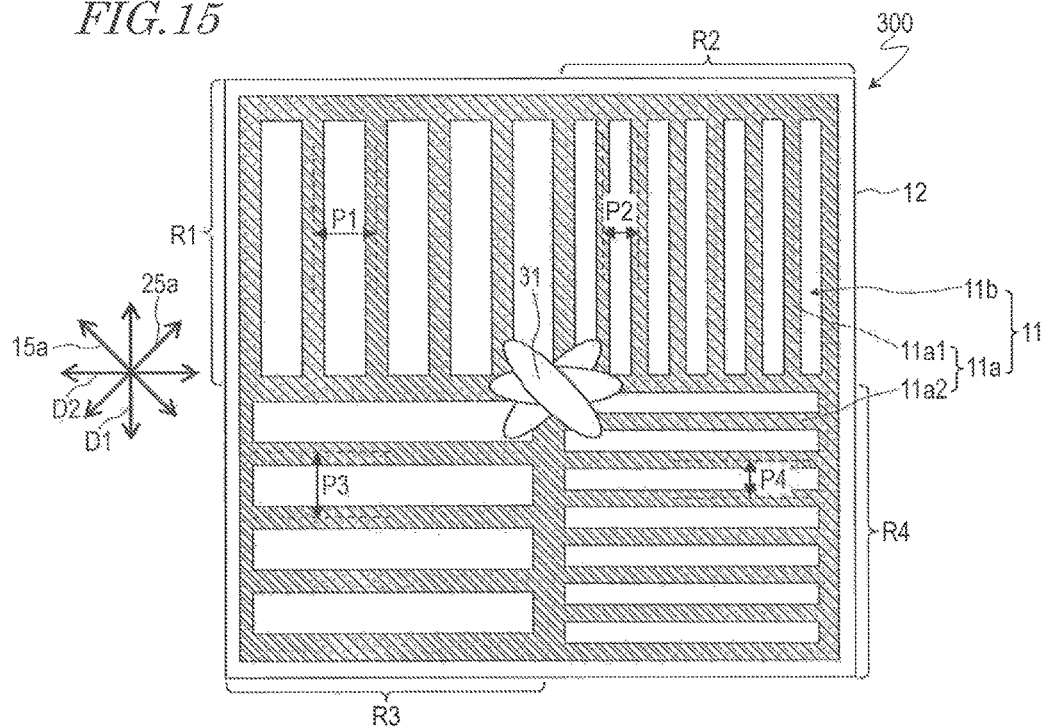
FIG. 15 A plan view schematically showing a liquid crystal display device 300 according to an embodiment of the present invention, illustrating a region corresponding to one pixel.

With reference to FIG. 15, a liquid crystal display device 300 according to the present embodiment will be described. FIG. 15 is a plan view schematically showing the liquid crystal display device 300, illustrating a region corresponding to one pixel.

In the liquid crystal display device 300 of the present embodiment, the construction of the upper electrode 11 is different from that in the liquid crystal display device 100 of Embodiment 1. In the present embodiment, the plurality of linear portions 11a of the upper electrode 11 are arranged so as to extend along a plurality of directions (specifically, two), and to result in a plurality of pitches (which herein is four), as shown in FIG. 15.

The plurality of linear portions 11a include: two or more linear portions 11a1 which extend along a first direction D1 (which herein is the vertical direction on the display surface); and two or more linear portions 11a2 which extend along a second direction D2 (which herein is the horizontal direction on the display surface) that is substantially orthogonal to the first direction D1. Some of the two or more linear portions 11a1 extending along the first direction D1 are arranged with a first pitch P1, while others are arranged with a second pitch P2 which is different from the first pitch P1. Some of the two or more linear portions 11a2 extending along the second direction D2 are arranged with a third pitch P3, while others are arranged with a fourth pitch P4 which is different from the third pitch P3.

Thus, each pixel includes: a first region R1 in which two or more linear portions 11a1 extending along the first direction D1 are arranged with the first pitch P1; a second region R2 in which two or more linear portions 11a1 extending along the first direction D1 are arranged with the second pitch P2; a third region R3 in which two or more linear portions 11a2 extending along the second direction D2 are arranged with the third pitch P3; and a fourth region R4 in which two or more linear portions 11a2 extending along the second direction D2 are arranged with the fourth pitch P4.

The first pitch P1 is e.g. 12 µm, and the second pitch P2 is e.g. 8 µm. The third pitch P3 is e.g. 10 µm, and the fourth pitch P4 is e.g. 6 µm. It will be appreciated that the first pitch P1, the second pitch P2, the third pitch P3, and the fourth pitch P4 are not limited to the values exemplified herein. Although an example is illustrated where the first pitch P1, the second pitch P2, the third pitch P3, and the fourth pitch P4 are all different, the first pitch P1 and the third pitch P3 may be equal, and the second pitch P2 and the fourth pitch P4 may be equal.

Figure 16:
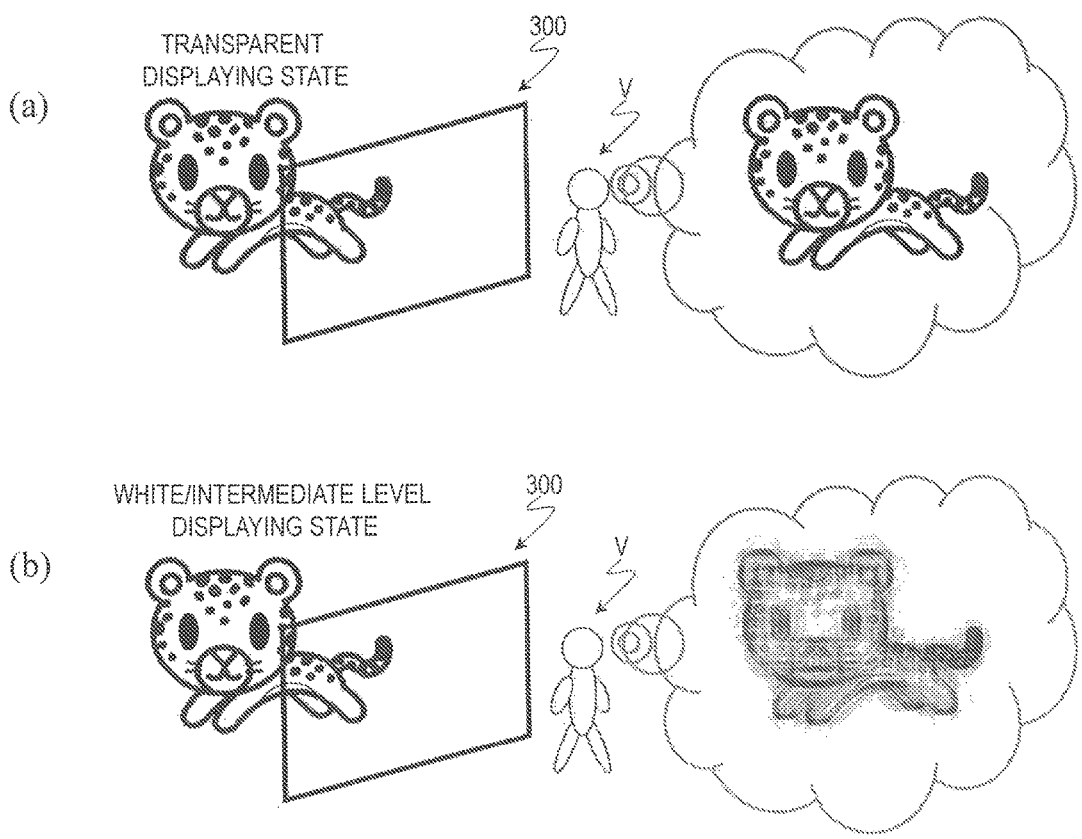
FIG. 16 (a) is a diagram schematically showing how a viewer V may observe the background via the liquid crystal display device 300 in a transparent displaying state; and (b) is a diagram schematically showing how a viewer V may observe the background via the liquid crystal display device 300 in a white/intermediate level displaying state.

Similarly to the liquid crystal display device 100 of Embodiment 1, the liquid crystal display device 300 of the present embodiment displays the background (see-through displaying) with pixels in which no voltage is applied to the liquid crystal layer 30 (transparent displaying state), so that, as shown in FIG. 16(a), a viewer V who observes the background via the liquid crystal display device 300 will vividly perceive the background. As a result, doubling blur is prevented, and the quality of see-through displaying improves.

Moreover, in the liquid crystal display device 300 of the present embodiment, the plurality of linear portions 11a of the upper electrode 11 are arranged so as to extend along a plurality of directions (specifically, two), and to result in a plurality of pitches (specifically, two or four). Therefore, in the present embodiment, as shown in FIG. 16(b), in the white displaying state and in an intermediate level displaying state, a viewer V who observes the background via the liquid crystal display device 300 will perceive a plurality of diffracted images which are shifted along the horizontal direction from the original image, as well as a plurality of diffracted images which are shifted along the vertical direction. Thus, an object on the rear face side can be made even hazier.

In the construction illustrated in FIG. 15, each of the first horizontal alignment film 14 and the second horizontal alignment film 24 is subjected to a uniform alignment treatment within the pixel. That is, the pretilt direction that is defined by the first horizontal alignment film 14 is identical among the first region R1, the second region R2, the third region R3, and the fourth region R4, and the pretilt direction that is defined by the second horizontal alignment film 24 is also identical among the first region R1, the second region R2, the third region R3, and the fourth region R4. Therefore, in the white displaying state and in the transparent displaying state, liquid crystal molecules 31 near the center along the thickness direction of the liquid crystal layer 30 are aligned substantially orthogonal to the first direction D1 (the combtooth direction in the first region R1 and the second region R2) in the first region R1 and the second region R2, and aligned substantially parallel to the second direction D2 (the combtooth direction in the third region R3 and the fourth region R4) in the third region R3 and the fourth region R4.

Figure 17:
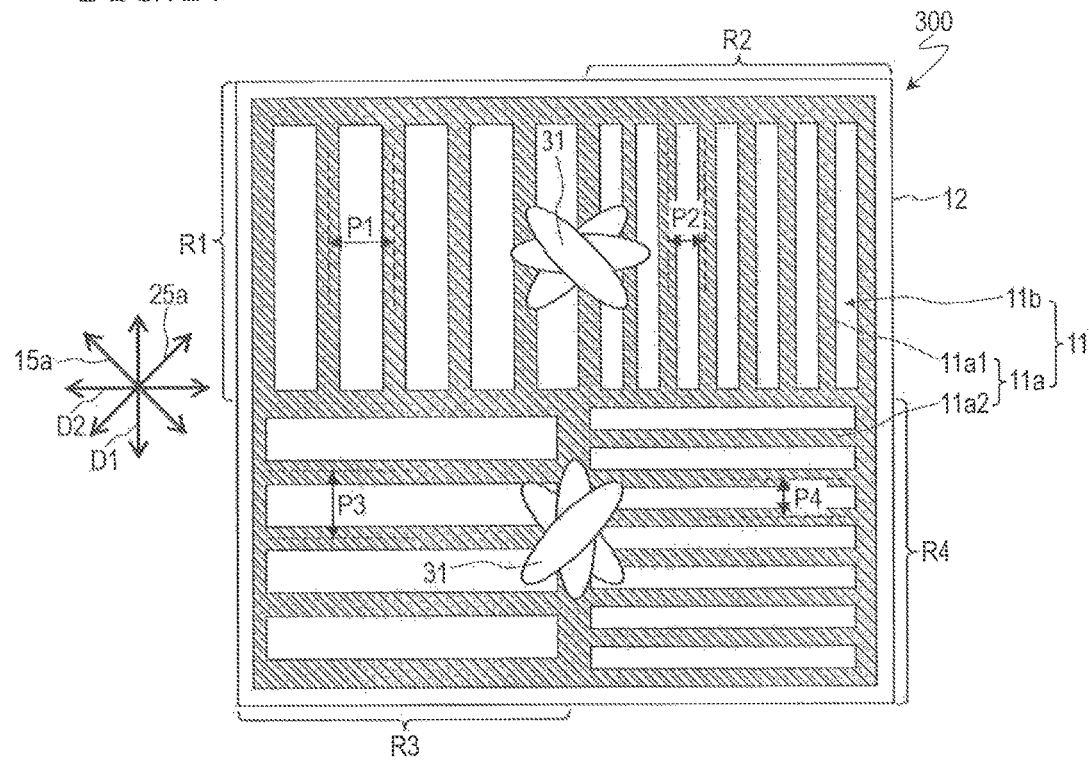
FIG. 17 A plan view schematically showing another construction for the liquid crystal display device 300.

Alternatively, a construction which is shown in FIG. 17 may be adopted. In the construction shown in FIG. 17, the pretilt direction that is defined by the first horizontal alignment film 14 differs by 90° between the first region R1 and second region R2 and the third region R3 and fourth region R4, and the pretilt direction that is defined by the second horizontal alignment film 24 also differs by 90° between the first region R1 and second region R2 and the third region R3 and fourth region R4. As a result, in the white displaying state and in the transparent displaying state, liquid crystal molecules 31 near the center along the thickness direction of the liquid crystal layer 30 are aligned substantially orthogonal to the combtooth direction in all of the first region R1, the second region R2, the third region R3, and the fourth region R4. When the construction which is shown in FIG. 17 is adopted, the effect of improving the brightness of display can be attained across the entire pixel (i.e., in all of the first region R1, the second region R2, the third region R3, and the fourth region R4).

Embodiment 4

Figure 18:
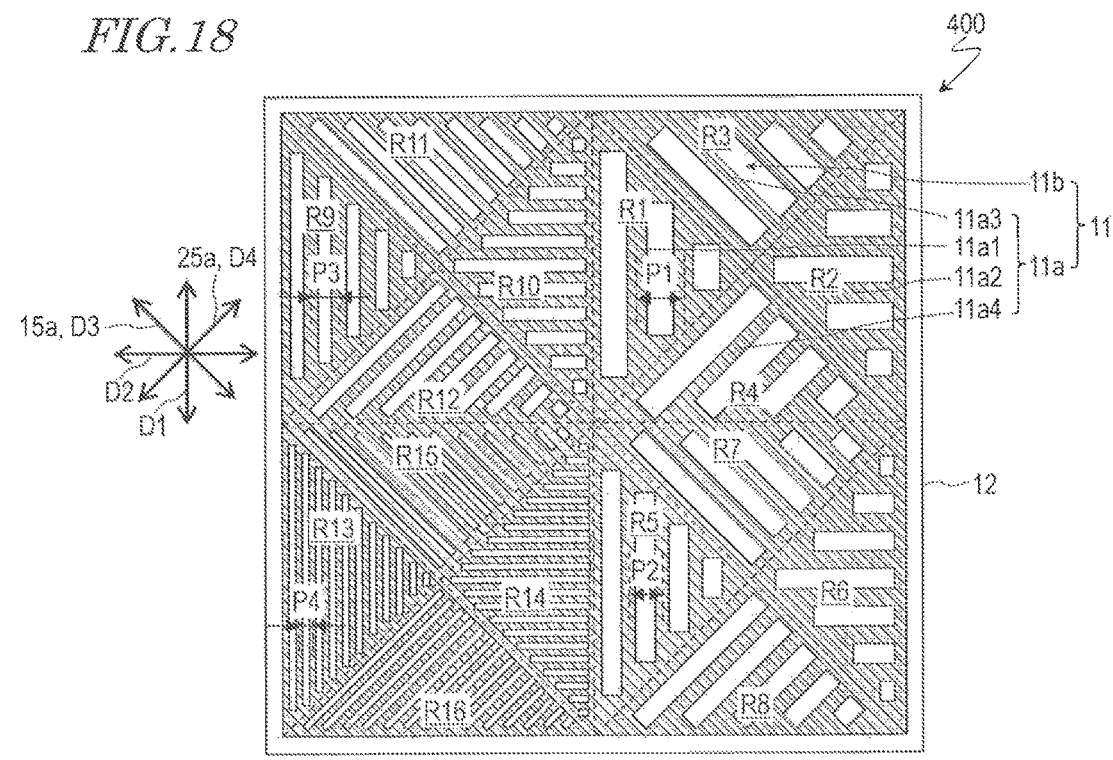
FIG. 18 A plan view schematically showing a liquid crystal display device 400 according to an embodiment of the present invention, illustrating a region corresponding to one pixel.

With reference to FIG. 18, a liquid crystal display device 400 according to the present embodiment will be described. FIG. 18 is a plan view schematically showing the liquid crystal display device 400, illustrating a region corresponding to one pixel.

In the liquid crystal display device 400 of the present embodiment, the construction of the upper electrode 11 is different from that in the liquid crystal display device 100 of Embodiment 1. In the present embodiment, the plurality of linear portions 11a of the upper electrode 11 are arranged so as to extend along a plurality of directions (specifically, four), and to result in a plurality of pitches (which herein is four), as shown in FIG. 18.

The plurality of linear portions 11a include: two or more linear portions 11a1 which extend along a first direction D1 (which herein is the vertical direction on the display surface); and two or more linear portions 11a2 which extend along a second direction D2 (which herein is the horizontal direction on the display surface) that is substantially orthogonal to the first direction D1. The plurality of linear portions 11a further include: two or more linear portions 11a3 which extend along a third direction D3 that is inclined (specifically, constituting an angle of substantially) 45° with respect to each of the first direction D1 and the second direction D2; and two or more linear portions 11a4 which extend along a fourth direction D4 that is inclined (specifically, constitute an angle of substantially) 45° with respect to each of the first direction D1 and the second direction D2 and intersects (or herein is substantially orthogonal to) the third direction D3.

Each pixel has sixteen regions, from a region R1 to a region R16.

In the region R1, two or more linear portions 11a1 extending along the first direction D1 are arranged with a first pitch P1; in the region R2, two or more linear portions 11a2 extending along the second direction D2 are arranged with the first pitch P1. In the region R3, two or more linear portions 11a3 extending along the third direction D3 are arranged with the first pitch P1; in the region R4, two or more linear portions 11a4 extending along the fourth direction D4 are arranged with the first pitch P1.

In the region R5, two or more linear portions 11a1 extending along the first direction D1 are arranged with a second pitch P2 which is different from the first pitch P1; in the region R6, two or more linear portions 11a2 extending along the second direction D2 are arranged with the second pitch P2. In the region R7, two or more linear portions 11a3 extending along the third direction D3 are arranged with the second pitch P2; in the region R8, two or more linear portions 11a4 extending along the fourth direction D4 are arranged with the second pitch P2.

In the region R9, two or more linear portions 11a1 extending along the first direction D1 are arranged with a third pitch P3 which is different from the first pitch P1 and the second pitch P2; in the region R10, two or more linear portions 11a2 extending along the second direction D2 are arranged with the third pitch P3. In the region R11, two or more linear portions 11a3 extending along the third direction D3 are arranged with the third pitch P3; in the region R12, two or more linear portions 11a4 extending along the fourth direction D4 are arranged with the third pitch P3.

In the region R13, two or more linear portions 11a1 extending along the first direction D1 are arranged with a fourth pitch P4 which is different from the first pitch P1, the second pitch P2, and the third pitch P3; in the region R14, two or more linear portions 11a2 extending along the second direction D2 are arranged with the fourth pitch P4. In the region R15, two or more linear portions 11a3 extending along the third direction D3 are arranged with the fourth pitch P4; in the region R16, two or more linear portions 11a4 extending along the fourth direction D4 are arranged with the fourth pitch P4.

Similarly to the liquid crystal display device 100 of Embodiment 1, the liquid crystal display device 400 of the present embodiment displays the background (see-through displaying) with pixels in which no voltage is applied to the liquid crystal layer 30 (transparent displaying state), so that, as shown in FIG. 19(a), a viewer V who observes the background via the liquid crystal display device 400 will vividly perceive the background. As a result, doubling blur is prevented, and the quality of see-through displaying improves.

Moreover, in the liquid crystal display device 400 of the present embodiment, the plurality of linear portions 11a of the upper electrode 11 are arranged so as to not only result in a plurality of pitches (specifically, four), but also extend in a plurality of directions (specifically, four); furthermore, these plural directions include not only the horizontal direction and the vertical direction on the display surface, but also oblique directions (the upper left-lower right direction and the upper right-lower left direction). Therefore, in the present embodiment, as shown in FIG. 19(b), in the white displaying state and in an intermediate level displaying state, a viewer V who observes the background via the liquid crystal display device 400 will perceive not only a plurality of diffracted images which are shifted along the horizontal direction and a plurality of diffracted images which are shifted along the vertical direction from the original image, but also a plurality of diffracted images which are shifted along the oblique directions. This allows more complex multiple images to be formed, whereby haziness of an object that is on the rear face side can be further increased (to a level which almost qualifies as a haziness based on scattering).

From the standpoint of brightness of display, during white displaying and transparent displaying, liquid crystal molecules 31 near the center along the thickness direction of the liquid crystal layer 30 are preferably aligned substantially orthogonal to the combtooth direction in each of the region R1 to the region R16. In other words, it is preferable that each of the first horizontal alignment film 14 and the second horizontal alignment film 24 is subjected to an alignment treatment that will achieve such alignments. It will be appreciated that, for the sake of simplifying the production steps, each of the first horizontal alignment film 14 and the second horizontal alignment film 24 may be subjected to a uniform alignment treatment within the pixel.

(Study Results on Effects)

Results of studying the effects of embodiments of the present invention (i.e., effects of making it difficult for an object on the rear face side to be perceived in the white displaying state and in an intermediate level displaying state) will be described.

The study was conducted by using a text image which is shown in FIG. 20. This text image is supposed to be a message card to be placed inside a showcase to which a see-through display is applied. The message card is to carry a description and price of a piece of merchandise.

When the see-through display is in the transparent displaying state, the text image which is shown in FIG. 20 will be perceived intact via the display. On the other hand, when the see-through display is in the white displaying state or an intermediate level displaying state, a diffraction phenomenon occurs due to a bright-dark pattern that appears in each pixel. For example, when the combteeth of the interdigitated electrodes extend along the vertical direction on the display surface, as shown in FIG. 21, a bright-dark pattern in which bright lines and dark lines extending along the vertical direction alternate along the horizontal direction will occur, whereby diffracted images will appear at positions which are shifted along the horizontal direction from the original image.

Assume that the text image shown in FIG. 20 has a font size of 3 mm, and that there is a distance of 3 cm from the see-through display to the message card. Given light with a wavelength of 550 nm, when the combteeth pitch is 6 μm, 8 μm, 10 μm and 12 μm, the diffraction angle θ for first-order light is about 5.3°, about 3.9°, about 3.2° and about 2.6°, respectively.

FIG. 22 shows a text image as observed via a see-through display having its combteeth arranged with a single pitch of 8 μm (i.e., the same construction as that of the liquid crystal display device 900 of Comparative Example 2). As can be seen from FIG. 22, although the text characters are less easy to read due to the diffracted images, a high contrast ratio exists between the text characters and the blank portions, and thus the haziness is not such that it prevents the text characters from being recognized.

FIG. 23 shows a text image as observed via a see-through display having its combteeth arranged with two pitches of 8 μm and 12 μm (i.e., the same construction as that of the liquid crystal display device 100 of Embodiment 1). As can be seen from FIG. 23, the text characters overlap with one another, and the contrast ratio between the text characters and the blank portions is lowered, and thus the haziness is such that it prevents the text characters from being recognized.

FIG. 24 shows a text image as observed via a see-through display having its combteeth arranged with a pitch of 12 μm along the vertical direction and a pitch of 8 μm along the horizontal direction. In the example shown in FIG. 23, although the text characters are not recognized, the spaces between lines still remain white, so that the text character lines and the spaces between lines can both be distinctively recognized. This allows it to be recognized as text, although the text characters themselves are not readable. On the other hand, the example shown in FIG. 24, where diffracted image appear also along the vertical direction in a manner of filling the spaces between lines, would hardly be recognizable as text.

FIG. 25 shows a text image as observed via a see-through display having its combteeth arranged so that two pitches of 8 μm and 12 μm are mixedly present along each of the vertical direction and the horizontal direction (i.e., the same construction as that of the liquid crystal display device 300 of Embodiment 3 where P1=P3 and P2=P4). As can be seen from FIG. 25, more diffracted image appear along both of the vertical direction and the horizontal direction than in the example of FIG. 24, thus further hindering recognition.

FIG. 26 shows a text image as observed via a see-through display having its combteeth arranged so that four pitches of 6 μm, 8 μm, 10 μm and 12 μm are mixedly present along each of the vertical direction, the horizontal direction, and oblique directions (i.e., the same construction as that of the liquid crystal display device 400 of Embodiment 4). As can be seen from FIG. 26, diffracted images occur not only along the vertical direction and the horizontal direction but also along oblique directions, thus still further hindering recognition.

Figure 27:
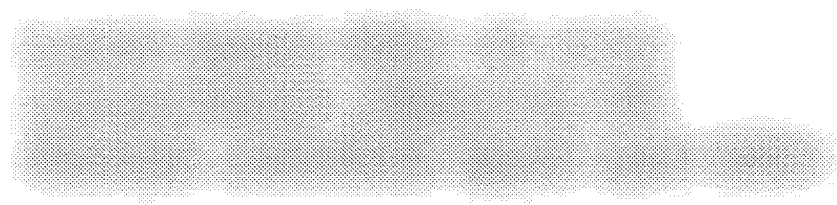
FIG. 27 A diagram showing a text image as observed via a common scatterer.

For reference sake, FIG. 27 shows a text image as observed via a common scatterer. From a comparison between FIG. 25, FIG. 26 and FIG. 27, it can be seen that the text images in the examples shown in FIG. 25 and FIG. 26 are almost as hazy as when being observed via a scatterer.

As described above, according to embodiments of the present invention, the plurality of linear portions (combteeth) 11a of the first electrode (interdigitated electrodes) 11 are arranged so that at least one of the following exists in plurality: the direction that they extend (combtooth direction) and their pitch (combteeth pitch). As a result, an object on the rear face side can be made difficult to be perceived in the white displaying state or an intermediate level displaying state.

From the standpoint of enhancing haziness, it is preferable that both the combtooth direction and the combteeth pitch exist in pluralities. Moreover, it is more preferable that three or more combtooth directions exist, or that three or more combteeth pitches exist.

Although the above description is directed to the case of conducting multicolor displaying by the field sequential method, a liquid crystal display device according to an embodiment of the present invention does not need to be of the type that performs multicolor displaying by the field sequential method. In other words, the liquid crystal display device may be of a type whose liquid crystal display panel includes color filters.

INDUSTRIAL APPLICABILITY

According to an embodiment of the present invention, there is provided a liquid crystal display device which excels in both response characteristics and display quality, the liquid crystal display device being suitable for use as a see-through display. A liquid crystal display device (see-through display) according to an embodiment of the present invention is used as a display device for an information display system or digital signage, for example.

REFERENCE SIGNS LIST 1 liquid crystal display panel
2 illumination element
2a light source unit
2b light guide plate
10 first substrate (rear substrate)
10a transparent substrate
11 first electrode (upper electrode)
11a linear portion (combtooth)
11b slit
12 second electrode (lower electrode)
13 insulating layer
14 first horizontal alignment film
15 first polarizing plate
15a transmission axis of first polarizing plate
16A first TFT
16B second TFT
17 gate bus line
18 source bus line
20 second substrate (front substrate)
20a transparent substrate
21 third electrode (counter electrode)
22 dielectric layer (overcoat layer)
24 second horizontal alignment film
25 second polarizing plate
25a transmission axis of second polarizing plate
30 liquid crystal layer
31 liquid crystal molecules
50 case
100, 200, 300, 400 liquid crystal display device

The invention claimed is:

1. A liquid crystal display device comprising:
a liquid crystal display panel including a first substrate and a second substrate opposing each other, and a liquid crystal layer provided between the first substrate and the second substrate, the liquid crystal display device including a plurality of pixels arranged in a matrix array, wherein,
the first substrate includes a first electrode provided for each of the plurality of pixels, and a second electrode that generates a lateral field across the liquid crystal layer in cooperation with the first electrode;
the second substrate includes a third electrode opposing the first electrode and the second electrode that generates a vertical field across the liquid crystal layer in cooperation with the first electrode and the second electrode;
each of the plurality of pixels is capable of switchably presenting:
a black displaying state where black displaying is performed with a vertical field being generated across the liquid crystal layer,
a white displaying state where white displaying is performed with a lateral field being generated across the liquid crystal layer, or
a transparent displaying state where a rear face side of the liquid crystal display panel is visible in a see-through manner with no voltage being applied to the liquid crystal layer;
the first electrode includes a plurality of slits and a plurality of linear portions each being located between two adjacent slits of the plurality of slits; and
the plurality of linear portions are arranged so that at least one of the following exists in a plurality: the direction that the linear portions extend and the pitch of the linear portions.

2. The liquid crystal display device of claim 1, wherein the plurality of linear portions are arranged so that both the direction that the linear portions extend and the pitch of the linear portions exist in pluralities.

3. The liquid crystal display device of claim 1, wherein,
the plurality of linear portions are arranged so that at least the direction that the linear portions extend exists in a plurality; and
the plurality of linear portions include two or more linear portions extending along a first direction and two or more linear portions extending along a second direction which is substantially orthogonal to the first direction.

4. The liquid crystal display device of claim 3, wherein the plurality of linear portions further include two or more linear portions extending along a third direction which is inclined with respect to each of the first direction and the second direction.

5. The liquid crystal display device of claim 1, wherein the plurality of linear portions are arranged so that three or more directions exist as the direction that the linear portions extend.

6. The liquid crystal display device of claim 1, wherein the plurality of linear portions are arranged so that three or more pitches of the linear portions exist.

7. The liquid crystal display device of claim 1, wherein, in the transparent displaying state, liquid crystal molecules in the liquid crystal layer take a twist alignment.

8. The liquid crystal display device of claim 1, wherein the first electrode is provided via an insulating layer on the second electrode.

9. The liquid crystal display device of claim 1, wherein the liquid crystal layer contains liquid crystal molecules having positive dielectric anisotropy.

10. The liquid crystal display device of claim 1, further comprising an illumination element capable of switchably irradiating the liquid crystal display panel with a plurality of color rays including red light, green light, and blue light.

11. The liquid crystal display device of claim 1, performing multicolor displaying by a field sequential method.

12. The liquid crystal display device of claim 1, wherein the liquid crystal display panel includes no color filters.

* * * * *